US012039593B1

(12) United States Patent
Lopez et al.

(10) Patent No.: US 12,039,593 B1
(45) Date of Patent: *Jul. 16, 2024

(54) SYSTEMS AND METHODS FOR INTERACTIVE FINANCIAL CATEGORIZATION AND BUDGETING

(71) Applicant: Wells Fargo Bank, N.A., San Francisco, CA (US)

(72) Inventors: Gilberto Lopez, Palo Alto, CA (US); Leslie Rae Witt, Mountain View, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,847

(22) Filed: Jan. 9, 2023

Related U.S. Application Data

(60) Continuation of application No. 16/554,271, filed on Aug. 28, 2019, now Pat. No. 11,551,291, which is a division of application No. 14/593,744, filed on Jan. 9, 2015, now Pat. No. 10,402,896.

(60) Provisional application No. 62/020,592, filed on Jul. 3, 2014.

(51) Int. Cl.
  *G06Q 40/00* (2023.01)
(52) U.S. Cl.
  CPC .................................. *G06Q 40/00* (2013.01)
(58) Field of Classification Search
  None
  See application file for complete search history.

(56) References Cited

U.S. PATENT DOCUMENTS

| | | |
|---|---|---|
| 5,944,784 A | 8/1999 | Simonoff et al. |
| 6,792,422 B1 | 9/2004 | Stride et al. |
| 7,565,139 B2 | 7/2009 | Neven et al. |
| 7,603,382 B2 | 10/2009 | Halt, Jr. |
| 7,641,124 B2 | 1/2010 | Brown et al. |

(Continued)

FOREIGN PATENT DOCUMENTS

| | | |
|---|---|---|
| GB | 2 513 238 A | 10/2014 |
| WO | WO-2013/120135 A2 | 8/2013 |

OTHER PUBLICATIONS

Ben Steverman, Apps that might help nudge you into financial health, Apr. 16, 2014, The Washington Post with Bloomberg (Year: 2014).

(Continued)

*Primary Examiner* — Narayanswamy Subramanian
(74) *Attorney, Agent, or Firm* — Foley & Lardner LLP

(57) ABSTRACT

A computer-implemented method includes providing first access rights to a bank account to a first user account of a first user, providing second access rights to a second user account of a second user, establishing a connection between the second user account and a server hosting a website for accessing information for the bank account, providing a user interface displaying a plurality of budget categories for categorizing at least one transaction via the website and according to the second access rights, determining a first subcategory and a second subcategory of the plurality of budget categories based on data associated with the at least one transaction, receiving a user input from the second user account comprising a selection of at least one of the first or second subcategory, and displaying to the user interface responsive to receiving the user input a summary section of the selected first subcategory or second subcategory.

12 Claims, 15 Drawing Sheets

(56) References Cited

U.S. PATENT DOCUMENTS

| | | |
|---|---|---|
| 7,895,102 B1 | 2/2011 | Wilks et al. |
| 7,921,048 B2 | 4/2011 | Sloan et al. |
| 7,945,512 B2 * | 5/2011 | Scipioni ............... G06Q 20/105 |
| | | 705/30 |
| 7,966,329 B1 | 6/2011 | Rukonic et al. |
| 8,032,481 B2 | 10/2011 | Pinckney et al. |
| 8,083,137 B2 | 12/2011 | Tannenbaum |
| 8,131,118 B1 | 3/2012 | Jing et al. |
| 8,160,941 B1 | 4/2012 | Field et al. |
| 8,421,872 B2 | 4/2013 | Neven, Sr. |
| 8,498,909 B1 | 7/2013 | Keld |
| 8,538,827 B1 | 9/2013 | Dryer et al. |
| 8,620,780 B2 | 12/2013 | Krakowiecki et al. |
| 8,639,621 B1 | 1/2014 | Ellis et al. |
| 8,639,622 B1 | 1/2014 | Moore et al. |
| 8,676,689 B1 | 3/2014 | Whelan |
| 8,719,132 B1 | 5/2014 | Diggdon et al. |
| 8,738,475 B2 | 5/2014 | Keld |
| 9,171,048 B2 | 10/2015 | Brust et al. |
| 9,721,282 B2 | 8/2017 | Hitchcock et al. |
| 9,727,910 B1 | 8/2017 | Wu |
| 9,805,536 B2 | 10/2017 | Lutnick et al. |
| 9,916,577 B1 | 3/2018 | Kurani et al. |
| 10,223,754 B1 | 3/2019 | Lopez et al. |
| 10,460,379 B1 | 10/2019 | Diggdon et al. |
| 11,068,987 B1 | 7/2021 | Kubera et al. |
| 2001/0047307 A1 | 11/2001 | Bennett et al. |
| 2002/0116245 A1 | 8/2002 | Hinkle et al. |
| 2003/0149647 A1 | 8/2003 | Youngblood, Jr. |
| 2005/0027632 A1 | 2/2005 | Zeitoun et al. |
| 2005/0149437 A1 | 7/2005 | Zellner et al. |
| 2005/0222931 A1 | 10/2005 | Mamou et al. |
| 2006/0047971 A1 | 3/2006 | Miyazaki et al. |
| 2006/0069619 A1 | 3/2006 | Walker et al. |
| 2007/0073705 A1 | 3/2007 | Gray |
| 2007/0156552 A1 | 7/2007 | Manganiello |
| 2007/0250421 A1 | 10/2007 | Major et al. |
| 2008/0010193 A1 | 1/2008 | Rackley, III et al. |
| 2008/0088628 A1 | 4/2008 | Lu et al. |
| 2009/0204539 A1 | 8/2009 | Parker |
| 2009/0307088 A1 | 12/2009 | Littlejohn |
| 2010/0057574 A1 | 3/2010 | Banerjee et al. |
| 2010/0075638 A1 | 3/2010 | Carlson et al. |
| 2010/0100424 A1 | 4/2010 | Buchanan et al. |
| 2010/0100469 A1 | 4/2010 | Buchanan et al. |
| 2010/0100470 A1 | 4/2010 | Buchanan et al. |
| 2010/0198724 A1 | 8/2010 | Thomas |
| 2010/0268629 A1 | 10/2010 | Ross et al. |
| 2010/0280935 A1 | 11/2010 | Fellowes et al. |
| 2010/0299252 A1 | 11/2010 | Thomas |
| 2011/0046981 A1 | 2/2011 | Metzler et al. |
| 2011/0107265 A1 | 5/2011 | Buchanan et al. |
| 2011/0130197 A1 | 6/2011 | Bytnar et al. |
| 2011/0137823 A1 | 6/2011 | Robb |
| 2011/0173041 A1 | 7/2011 | Breitenbach et al. |
| 2011/0208588 A1 | 8/2011 | Joa et al. |
| 2011/0279242 A1 | 11/2011 | Krawczewicz |
| 2011/0320325 A1 | 12/2011 | Preston et al. |
| 2012/0083705 A1 | 4/2012 | Yuen et al. |
| 2012/0130870 A1 | 5/2012 | Shergill et al. |
| 2012/0158557 A1 | 6/2012 | Minzner et al. |
| 2012/0179548 A1 | 7/2012 | Sun et al. |
| 2012/0215668 A1 | 8/2012 | Krakowiecki et al. |
| 2012/0265587 A1 | 10/2012 | Kinkead et al. |
| 2012/0290449 A1 | 11/2012 | Mullen et al. |
| 2012/0296768 A1 | 11/2012 | Fremont-Smith et al. |
| 2012/0330830 A1 | 12/2012 | Mason et al. |
| 2013/0018778 A1 | 1/2013 | Bohanan et al. |
| 2013/0018792 A1 | 1/2013 | Casey et al. |
| 2013/0030994 A1 | 1/2013 | Calman et al. |
| 2013/0046620 A1 | 2/2013 | Pahls et al. |
| 2013/0046702 A1 | 2/2013 | Ross et al. |
| 2013/0085816 A1 | 4/2013 | Wilmore et al. |
| 2013/0085919 A1 | 4/2013 | Keld et al. |
| 2013/0159195 A1 | 6/2013 | Kirillin et al. |
| 2013/0282573 A1 | 10/2013 | Mullen et al. |
| 2013/0282576 A1 | 10/2013 | Kinsey |
| 2013/0297400 A1 | 11/2013 | Nagarajan et al. |
| 2013/0325946 A1 | 12/2013 | Allison et al. |
| 2014/0006050 A1 | 1/2014 | Feinschreiber et al. |
| 2014/0006114 A1 | 1/2014 | Nuzzi et al. |
| 2014/0006272 A1 | 1/2014 | Calman et al. |
| 2014/0012683 A1 | 1/2014 | Patel et al. |
| 2014/0012704 A1 | 1/2014 | Mizhen et al. |
| 2014/0012722 A1 | 1/2014 | Keld |
| 2014/0046816 A1 | 2/2014 | Avari et al. |
| 2014/0047331 A1 | 2/2014 | Feldman et al. |
| 2014/0057610 A1 | 2/2014 | Olincy et al. |
| 2014/0058666 A1 | 2/2014 | Sheha et al. |
| 2014/0067634 A1 | 3/2014 | Sowder et al. |
| 2014/0067712 A1 | 3/2014 | Prasad et al. |
| 2014/0095337 A1 | 4/2014 | Pigeon et al. |
| 2014/0136381 A1 | 5/2014 | Joseph et al. |
| 2014/0149249 A1 | 5/2014 | Goad et al. |
| 2014/0149288 A1 | 5/2014 | Martini et al. |
| 2014/0164198 A1 | 6/2014 | Caldwell |
| 2014/0172686 A1 | 6/2014 | Haggerty et al. |
| 2014/0172700 A1 | 6/2014 | Teuwen et al. |
| 2014/0173477 A1 | 6/2014 | Wang et al. |
| 2014/0180962 A1 | 6/2014 | Fiala et al. |
| 2014/0188678 A1 | 7/2014 | Keld |
| 2014/0236789 A1 | 8/2014 | Caldwell |
| 2014/0249977 A1 | 9/2014 | Kuznetsov et al. |
| 2014/0255984 A1 | 9/2014 | Sharpin |
| 2014/0258007 A1 | 9/2014 | Calman et al. |
| 2014/0279302 A1 | 9/2014 | Akin |
| 2014/0317020 A1 | 10/2014 | Birbara et al. |
| 2014/0317022 A1 | 10/2014 | Haggerty et al. |
| 2014/0358666 A1 | 12/2014 | Baghaie et al. |
| 2015/0019427 A1 | 1/2015 | Murphy et al. |
| 2015/0082342 A1 | 3/2015 | Norwood et al. |
| 2015/0112821 A1 | 4/2015 | Giacometti |
| 2015/0135286 A1 | 5/2015 | Egan et al. |
| 2015/0161674 A1 | 6/2015 | Khoury et al. |
| 2015/0182130 A1 | 7/2015 | Utter, II |
| 2015/0185034 A1 | 7/2015 | Abhyanker |
| 2015/0186869 A1 | 7/2015 | Winters et al. |
| 2015/0186886 A1 | 7/2015 | Schwalb et al. |
| 2015/0193868 A1 | 7/2015 | Del Vecchio et al. |
| 2015/0221044 A1 | 8/2015 | Ariff et al. |
| 2015/0227890 A1 | 8/2015 | Bednarek et al. |
| 2015/0235277 A1 | 8/2015 | Bagley |
| 2015/0302464 A1 | 10/2015 | Iannace et al. |
| 2015/0332264 A1 | 11/2015 | Bondesen et al. |
| 2016/0005025 A1 | 1/2016 | Zamer |
| 2016/0034562 A1 | 2/2016 | Malcolm-Dacosta |
| 2016/0034932 A1 | 2/2016 | Sion et al. |
| 2016/0063235 A1 | 3/2016 | Tussy |
| 2016/0104252 A1 | 4/2016 | Simpson et al. |
| 2016/0117765 A1 | 4/2016 | Koeppel et al. |
| 2016/0180465 A1 | 6/2016 | Deperro et al. |
| 2016/0253702 A1 | 9/2016 | Gonzales, Jr. |
| 2016/0342992 A1 | 11/2016 | Lee |
| 2016/0350848 A1 | 12/2016 | Acharya et al. |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0109178 A1 | 4/2017 | Chen et al. |
| 2017/0287064 A1 | 10/2017 | Sion et al. |
| 2018/0108062 A1 | 4/2018 | Mchale et al. |
| 2018/0253691 A1 | 9/2018 | High et al. |
| 2018/0356823 A1 | 12/2018 | Cooper |
| 2019/0147529 A1 | 5/2019 | Wright et al. |
| 2020/0342387 A1 | 10/2020 | Rajkhowa et al. |
| 2023/0214831 A1 * | 7/2023 | Lee ..................... G06N 20/10 |
| | | 705/75 |

OTHER PUBLICATIONS

U.S. Appl. No. 14/090,229, filed Nov. 26, 2013, Wells Fargo Bank, NA.

(56) References Cited

OTHER PUBLICATIONS

Coin, Inc. Frequently Asked Questions (n.d.) retrieved from the internet at: https://onlycoin.com/support/faq/ on Aug. 11, 2014, 13 pages as printed.

Cole, "Coin aims to replace analog credit cards with a single iPhone-connected accessory", Apple Insider—Online, Nov. 14, 2013, retrieved from the internet at: http://appleinsider.com/articles/13/11/14/coin-aims-to-replace-all-analog-credit-cards-with-a-single-iphone-connected-accessory on Aug. 11, 2014, 2 pages.

Herrador-Alcaide, A Model for Personal Financial Planning Towards Retirement, Journal of Business Economics and Management, 2021, vol. 22 (2), p. 482-502 (Year: 2021).

Levy, "Coin, The Programmable Credit Card", The Bottom Line, Feb. 5, 2014, retrieved fromt the interent at: http://thebottomline.as.ucsb.edu/2014/02/coin-the-programmable-credit-card on Aug. 11, 2014, 2 pages as printed.

NetApp, "Active IQ Blog," (May 28, 2020), https://www.netapp.com/blog/data-management-active-iq/, pp. 1-9.

Pepitone, "Digital credit card Coin adds new features after post-launch criticism", CNN Money—Online, Nov. 20, 2013, retrieved from the internet at http://money.cnn.com/2013/11/20/technology/innovation/coin-card-startup/ on Aug. 11, 2014, 2 pages as printed.

Perez, "After a Series of Maintenance Glitches, Bank Simple Rolls Out an Improved, Rebuilt Mobile App", TechCrunch—Online, Aug. 19, 2014, retrieved from the internet at: http://techcrunch.com/2014/08/19/after-a-series-of-maintenance-glitches-bank-simple-rolls-out-an-improved-rebuilt-mobile-app/ on Aug. 19, 2014, 7 pages.

Stephanie Walter, The State of Responsive Web Design, May 29, 2013, Smashing Magazine (Year: 2013).

\* cited by examiner

|         |        |          | A | B | C |
|---------|--------|----------|---|---|---|
| MAY 3   | COM ED | $64.00   | ✓ |   |   |
| MAY 5   | MACY'S | $153.25  |   | ✓ |   |
| MAY 7   | TARGET | $47.50   | 33% | 67% |   |

Fig. 4

SYSTEMS AND METHODS FOR INTERACTIVE FINANCIAL CATEGORIZATION AND BUDGETING

CROSS-REFERENCE TO RELATED PATENT APPLICATIONS

This application is a continuation of U.S. patent application Ser. No. 16/554,271, filed Aug. 28, 2019, which is a divisional of U.S. patent application Ser. No. 14/593,744, filed Jan. 9, 2015, now U.S. Pat. No. 10,402,896, which claims the benefit of and priority to U.S. Provisional Application No. 62/020,592, filed Jul. 3, 2014, each of which are incorporated herein by reference in their entirety.

BACKGROUND

The present disclosure relates generally to systems and methods of financial management and, more specifically, to systems and methods for simple interactive financial categorization and budgeting.

Individuals often rely on computer-based systems to manage their personal finances. Conventional personal financial management systems include software and internet-based systems. Certain systems allow users to create budgets and to categorize transactions into various budget categories. However, many systems are cumbersome and difficult to use. For example, conventional systems often have ten or more categories to which users can assign budgets and categorize transactions. Users are often overwhelmed by the many categories that are available and cannot keep track of budgets associated with each of the many categories. In addition, identifying and categorizing each transaction may require a series of steps and menus, which may be difficult and/or intimidating to certain users. Thus, there is a need for a simplified personal financial management system to categorize transactions and manage budgets.

SUMMARY

One embodiment relates to a computer-implemented method of managing personal financial accounts. The method includes retrieving account information associated with a financial account of a user. The account information includes a plurality of transactions and no more than three budget categories. The method also includes providing a user interface to display graphical representations of at least a portion of the plurality of transactions and at least a portion of the budget categories. In addition, the method includes receiving a first input from the user categorizing one of the transactions into one or more of the plurality of budget categories. Further, the method includes updating the user interface to reflect the categorization of the transaction.

Another embodiment relates to a system for managing personal financial accounts. The system includes a data storage system, a processor, and program logic stored in memory and executed by the processor. The program logic includes account management logic configured to retrieve account information associated with a financial account of a user. The account information includes a plurality of transactions and no more than three budget categories. The program logic also includes personal financial management logic coupled to the account management logic and configured to provide a user interface to display graphical representations of at least a portion of the plurality of transactions and at least a portion of the budget categories, to receive a first input from the user categorizing one of the transactions into one or more of the plurality of budget categories, and to update the user interface to reflect the categorization of the transaction.

Another embodiment relates to a computer-implemented method of managing personal financial accounts. The method includes managing bank accounts respectively associated with a plurality of account holders for a bank, including processing transactions for the bank accounts. The transactions include at least credit card transactions and checking transactions. The first user has full access to a first bank account. The method also includes providing a second user restricted access to the first bank account and establishing a connection with the second user via the Internet, including providing the second user with web access to an on-line banking area of a website of the bank. In addition, the method includes providing the second user, according to the restricted access, a user interface to display at least a portion of a plurality of budget categories and at least a portion of transactions associated with the first bank account. The method further includes receiving a first input from the second user to flag a transaction and, responsive to the first input, updating the user interface to reflect the flag and notifying the first user of the flag.

Another embodiment relates to a system for managing personal financial accounts. The system includes a data storage system, a processor, and program logic stored in memory and executed by the processor. The program logic includes account management logic configured to manage bank accounts respectively associated with a plurality of account holders for a bank, including processing transactions for the bank accounts. The transactions include at least credit card transactions and checking transactions. The program logic also includes rights management logic coupled to the account management logic and configured to provide a first user full access to a first bank account and to provide a second user restricted access to the first bank account. The program logic further includes personal financial management logic coupled to the account management logic and to the rights management logic. The personal financial management logic is configured to establish a connection with the second user via the Internet, including providing the second user with web access to an on-line banking area of a website of the bank; provide the second user, according to the restricted access, a user interface to display at least a portion of a plurality of budget categories and at least a portion of transactions associated with the first bank account; receive a first input from the second user to flag a transaction; and responsive to the first input, update the user interface to reflect the flag and notifying the first user of the flag.

BRIEF DESCRIPTION OF THE DRAWINGS

FIG. 4 illustrates a user interface to display financial account data according to an exemplary embodiment.

DETAILED DESCRIPTION

In general, embodiments of the present disclosure provide systems and methods for personal financial management. Specifically, exemplary systems and methods provide simplified interfaces for users to categorize financial transactions into simple budget categories and to manage budgets.

Figure 1:
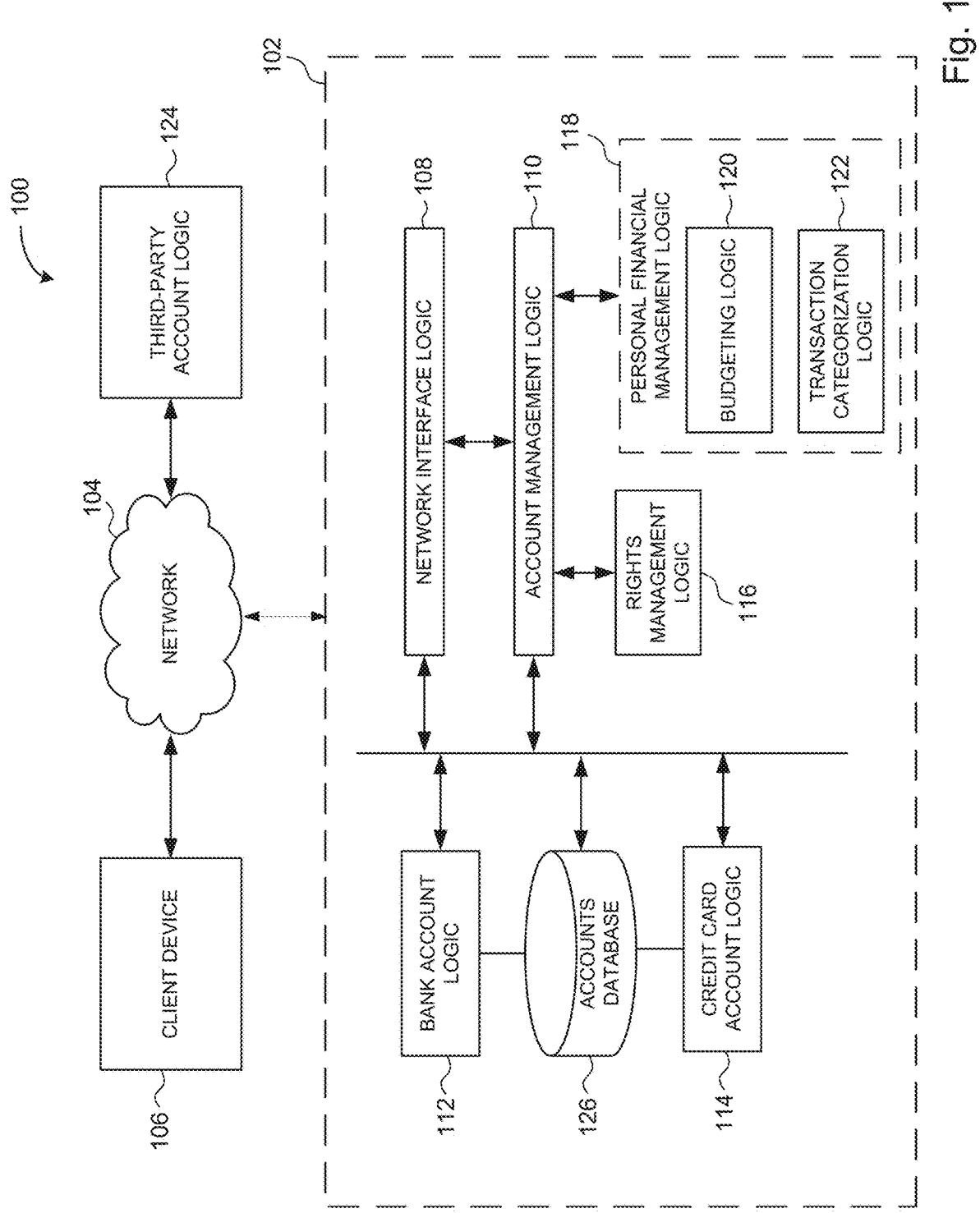
FIG. 1 is a block diagram of a data processing system according to an exemplary embodiment.

FIG. 1 is a block diagram illustrating a data processing system 100 according to an exemplary embodiment. The data processing system 100 includes a financial management system 102 configured to, among other things, manage personal financial accounts at one or more financial institutions. In the example of FIG. 1, the financial management system 102 is implemented by an enterprise computing system of a financial institution at which a user has one or more financial accounts.

The user may access the financial management system 102 via a network 104 (e.g., the Internet or an intranet) using a client device 106 (e.g., a computer or a mobile device) or in another manner. In one embodiment, the user may, for example, access the financial management system 102 through an on-line banking area of a website or application provided by the bank based on a valid username and password. Upon entering the on-line banking area of the website or application, the user may be provided with profile information, such as one or more partial bank account numbers of the account or the accounts held by the user at the financial institution providing the financial management system 102.

The financial management system 102 may include, among other systems, network interface logic 108; account management logic 110; bank account logic 112; credit card account logic 114; rights management logic 116; and personal financial management logic 118, including budgeting logic 120 and transaction categorization logic 122. Such logics and other logics discussed herein may, in practice, be implemented in a machine (e.g., one or more computers or servers) comprising machine-readable storage media (e.g., cache, memory, internal or external hard drive or in a cloud computing environment) having instructions stored therein which are executed by the machine to perform the operations described herein. For example, the financial management system 102 may include server-based computing systems, for example, comprising one or more networked computer servers that are programmed to perform the operations described herein. In another example, the financial management system 102 may be implemented as a distributed computer system where each function is spread over multiple computer systems.

Network interface logic 108 may be used to connect the financial management system 102 to the Internet to permit users to access the financial management system 102, for example, through an on-line banking website or other website, through an application, or in other ways. For example, the network interface logic 108 may comprise one or more computers or web servers that provide a graphical user interface (e.g., a series of dynamically-generated web pages) for users that access the financial management system 102 through the web. The graphical user interface may be used to prompt the user to provide login information, passwords and other authentication information or other stored tokens, to provide the user with account information. The network interface logic 108 may also comprise other logic that is configured to provide an interface for other types of devices such as mobile devices (e.g., cell phones, smart phones, tablet computers, mobile e-mail devices, and the like), fax machines, ATMs, server-based computing systems, and the like. The network interface logic 108 may provide access to an application programming interface (API) for various third party networks such as Mint, Wasabe, Facebook, or LinkedIn, among others. The network interface logic 108 may also be used to connect to third-party account logic 124 to provide access to users' accounts (e.g., bank accounts, brokerage accounts, credit card accounts, etc.) managed by third-parties that are external to the financial management system 102.

The account management logic 110 may interact with various backend systems in connection with maintaining financial accounts for account owners. For example, the account management logic 110 may manage bank accounts (e.g., checking and savings accounts) via bank account logic 112 and credit card accounts via credit card account logic 114. The bank account logic 112 and credit card account logic 114 may store account information for various users' accounts in one or more accounts databases 126. The account management logic 110 manages each user's accounts by facilitating, among other things, account processing, account records, statement generation, bill pay, funds transfers, and the like. Account records include, among other things, records of financial transactions associated with each account. Financial transactions may include, for example, credits or debits to a user's account, such as the purchase of a good or the deposit of a paycheck, and various metadata associated therewith.

The rights management logic 116 allows the financial management system 102 to securely authenticate users with their accounts and to prevent fraudulent access by non-authorized users. In addition, the rights management logic 116 allows users to provide various levels of account access to other users. For example, some embodiments are configured to facilitate family banking. In these embodiments, an account owner (e.g., a parent) may grant another user (e.g., a child) certain levels of access to an account or to various portions of an account. For example, an account owner may provide access to other users to a certain budget category. In addition, account owners may restrict the information available to other users. For example, an account owner may hide actual transaction amounts (e.g., dollar amounts) and instead show relative amounts, such as a percentage of a transaction amount relative to a total budget category amount. In other examples, an account owner may hide transactions or budget categories. In another example, an account owner may give another user the ability to view account information (e.g., balances), but not to conduct transactions.

In addition to the above, the account management logic 110 provides enhanced functionality to users by utilizing personal financial management logic 118, which includes budgeting logic 120 and transaction categorization logic 122. As explained in further detail below, budgeting logic 120 allows users to create and manage various budgets, and transaction categorization logic 122 facilitates the categorization of transactions within various budget categories. In some embodiments, the transaction categorization logic 122 facilitates manual transaction categorization by a user. In other embodiments, the transaction categorization logic 122 automatically "pre-categorizes" or "suggests" categorization based on a user's prior usage or categorization history, or based on other parameters (e.g., merchant, merchant category, amount, anonymized data, etc.). In further embodiments, the transaction categorization logic 122 automatically categorizes transactions, which a user may later re-categorize if he or she disagrees with the automatic categorization. The transaction categorization logic 122 is configured to "learn" from users' categorization history, transaction history, and corresponding patterns or habits to optimize subsequent automatic categorization or "pre-categorization."

In some embodiments, the account management logic 110 is configured to provide recommended spending adjustments to a user based on the user's account activity. For example, if the account management logic 110 determines that the user spends a significant portion of a budget at a single merchant, the account management logic 110 may recommend spending adjustments to facilitate adherence to the budget. In some embodiments, the account management logic 110 is further configured to acknowledge good spending habits, such as adhering to a budget or exceeding a savings goal. For example, the account management logic 110 may be configured to provide rewards points to a customer for exceeding a savings goal. In various embodiments, the rewards points are issued by the financial institution (e.g., a bank) at which the user has a financial account and/or by other entities, such as entities connected through the third-party account logic 124.

Figure 2:
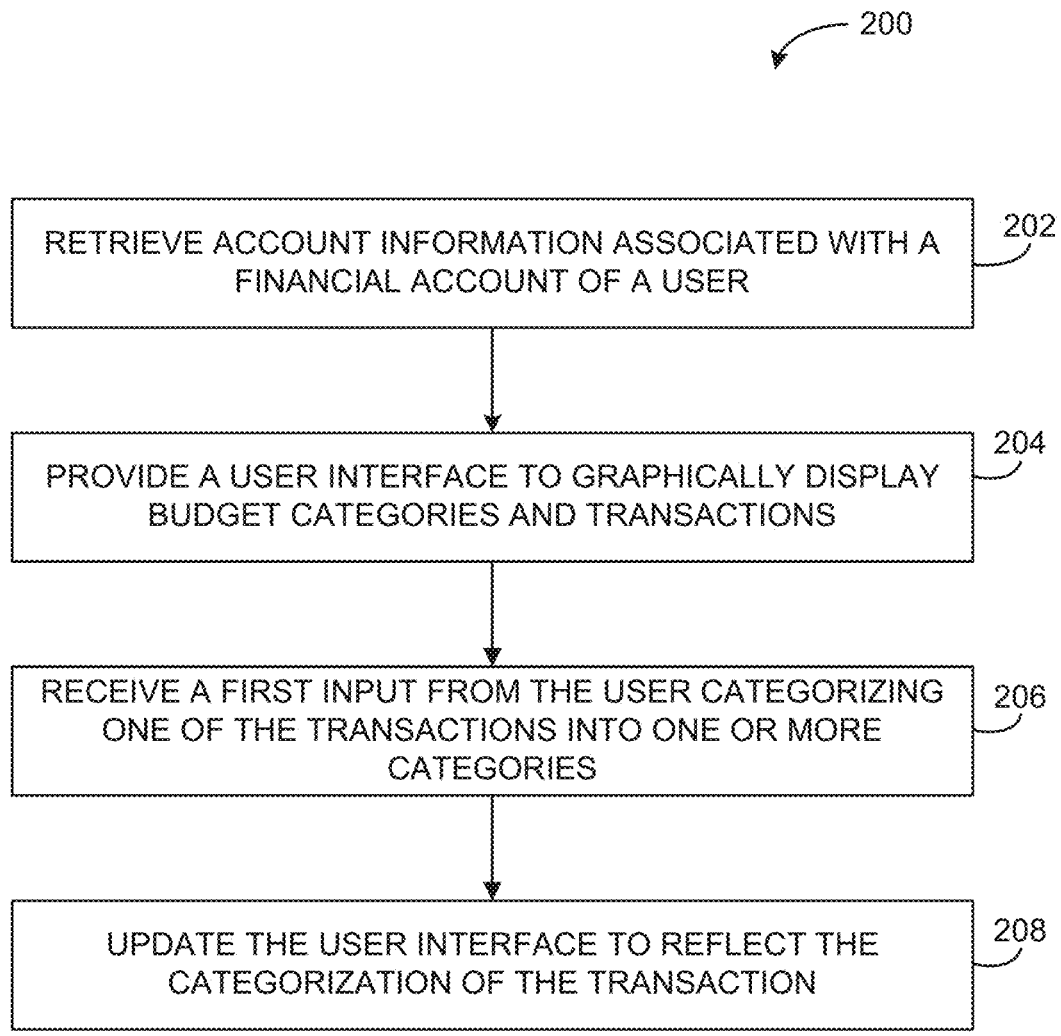
FIG. 2 is a flow diagram of a method of categorizing transactions according to an exemplary embodiment.

Turning now to FIG. 2, a flow diagram of a method 200 of categorizing transactions according to an exemplary embodiment is shown. For example, the method 200 may be performed by the data processing system 100 of FIG. 1, utilizing the personal financial management logic 118, including the budgeting logic 120 and the transaction categorization logic 122.

At 202, account information associated with a financial account of a user is retrieved. In one embodiment, the bank account logic 112 provides account information associated with a bank account (e.g., checking account and/or savings account) of the user, which may be stored in the accounts database 126. Similarly, if the user has a credit card account, the credit card account logic 114 may provide account information associated with the user's credit card account, which may be stored in the accounts database 126. The account information includes transaction records associated with each of the user's accounts. Each transaction record includes various metadata including, for example, a date of the transaction, an amount of the transaction, a merchant or party to the transaction, a location of the transaction, a merchant code, and/or a predetermined transaction code, among other things.

At 204, a user interface is provided to a user to graphically display budget categories and transactions. In some embodiments, the user interface is provided to the user via the client device 106. In some embodiments, the user interface may comprise, for example, a series of dynamically-generated web pages or screen displays provided by an application running locally on the client device 106, or by one or more web servers accessed over the Internet via the client device 106. In certain embodiments, the client device 106 may comprise a personal computer, a tablet computer, a mobile telephone, an Internet appliance, or any other type of computing device.

Various budget categories may be provided. In some embodiments, no more than four budget categories are provided to set forth a very simple and easy to use system. In other embodiments, no more than three budget categories are provided. In one embodiment, only two budget categories are displayed and a third budget category (e.g., savings) is determined based on the other two budget categories. Users may tend to be less intimidated by systems utilizing a small number of easily understandable categories rather than those using a large number of discrete categories.

For example, one embodiment provides three budget categories according to a "50/30/20 Rule" of personal financial management. The 50/30/20 Rule provides a budget that divides after-tax income, or net pay, into three categories: (1) fifty percent for needs; (2) thirty percent for wants; and (3) twenty percent for savings and debt. "Needs" include any expenses an individual cannot forgo in a given month, such as rent, groceries and minimum payments on credit cards, mortgages and auto loans. "Wants" include expenses that are not immediately necessary, such as vacations, gifts, entertainment, clothes, and dining out. Savings and debt includes, for example, paying down credit cards, and creating an emergency fund, and saving for retirement. In one embodiment, transactions are categorized as "Needs," as "Wants," or as partially "Needs" and partially "Wants." "Savings" may be determined based on additional remaining cash flow over a time period after categorizing the transactions that occurred over the time period as "Needs" and/or "Wants."

The budget categories may be graphically displayed in various ways. In one embodiment, the budget categories are provided as text, such as a textual label. In another embodiment, each budget category is color-coded with a different color. In other embodiments, the budget categories are presented as columns in a table or list. In further embodiments, the budget categories are provided as any of various types of shapes. The shapes corresponding to each budget category may vary in size according to the percentage of the total budget attributable to each respective category. In other embodiments, budget categories are graphically displayed using a combination of text and images. In some embodiments, the budget categories are provided as a treemap.

Transactions may also be graphically displayed in various ways. In one embodiment, the transactions are provided in a list. In another embodiment, each transaction is provided as an individual shape. Each shape may have the same size or the size of each shape may vary according to the amount of the transaction associated with the respective shape. In some embodiments, transactions are provided as a treemap. In certain embodiments, some or all of the metadata associated with each transaction is also displayed.

At 206, a first input is received from the user categorizing one of the transactions into one or more of the plurality of budget categories. In various embodiments, a user can provide an input via, for example, a computer mouse, a keyboard, a touchscreen, and/or a voice command. In one embodiment, the input comprises a "drag and drop" action in which the user selects a transaction, drags it on top of a particular budget category, and drops it thereon. In another embodiment, a user slides the transaction towards a budget category. In a further embodiment, a user selects a budget category from a drop-down list or a radio button associated with the transaction.

In some embodiments, a user can categorize a transaction into more than one budget category. For example, a transaction at a grocery store may comprise both "needs" (e.g., basic groceries) and "wants" (e.g., snacks). Some embodiments include a field in which a user can specify an amount or a portion of a transaction attributable to each category. In another embodiment, each transaction includes a slider that a user can slide toward a first end or a second end to define an amount of a transaction that is attributed to each of two budget categories. In other embodiments, a transaction can be dragged to a position such that it overlaps more than one category. In one embodiment, upon dropping the transaction onto more than one category, the user interface attributes a portion of the transaction to each category based on the percentage of the transaction graphic overlapping each category graphic. In another embodiment, upon detecting that the transaction graphic overlapped more than one category, the user interface prompts the user to input the amount of the transaction attributable to each category.

At 208, the user interface is updated to reflect the categorization of the transaction. In some embodiments, each budget category includes a visual representation of a dollar amount and a percentage of the total amount attributable to each budget category. In such embodiments, those fields are automatically updated upon categorizing each transaction. In other embodiments, as mentioned above, the budget categories are graphically displayed as various types of charts or shapes. In these embodiments, the corresponding charts and shapes may also be automatically updated upon categorizing each transaction. For example, in some embodiments, the size of a shape associated with a budget category increases or decreases as transactions are categorized therewith, based on the amount of each transaction. In other embodiments, a shape associated with a budget category is filled in or colored based on the amount of the transactions attributed to that budget category. In some embodiments, a transaction itself may be updated once it is categorized. For example, a transaction may change color to the color of the budget category in which it is categorized. In embodiments involving "drag and drop" categorization, transactions may be removed from the user interface upon being categorized.

Figure 3:
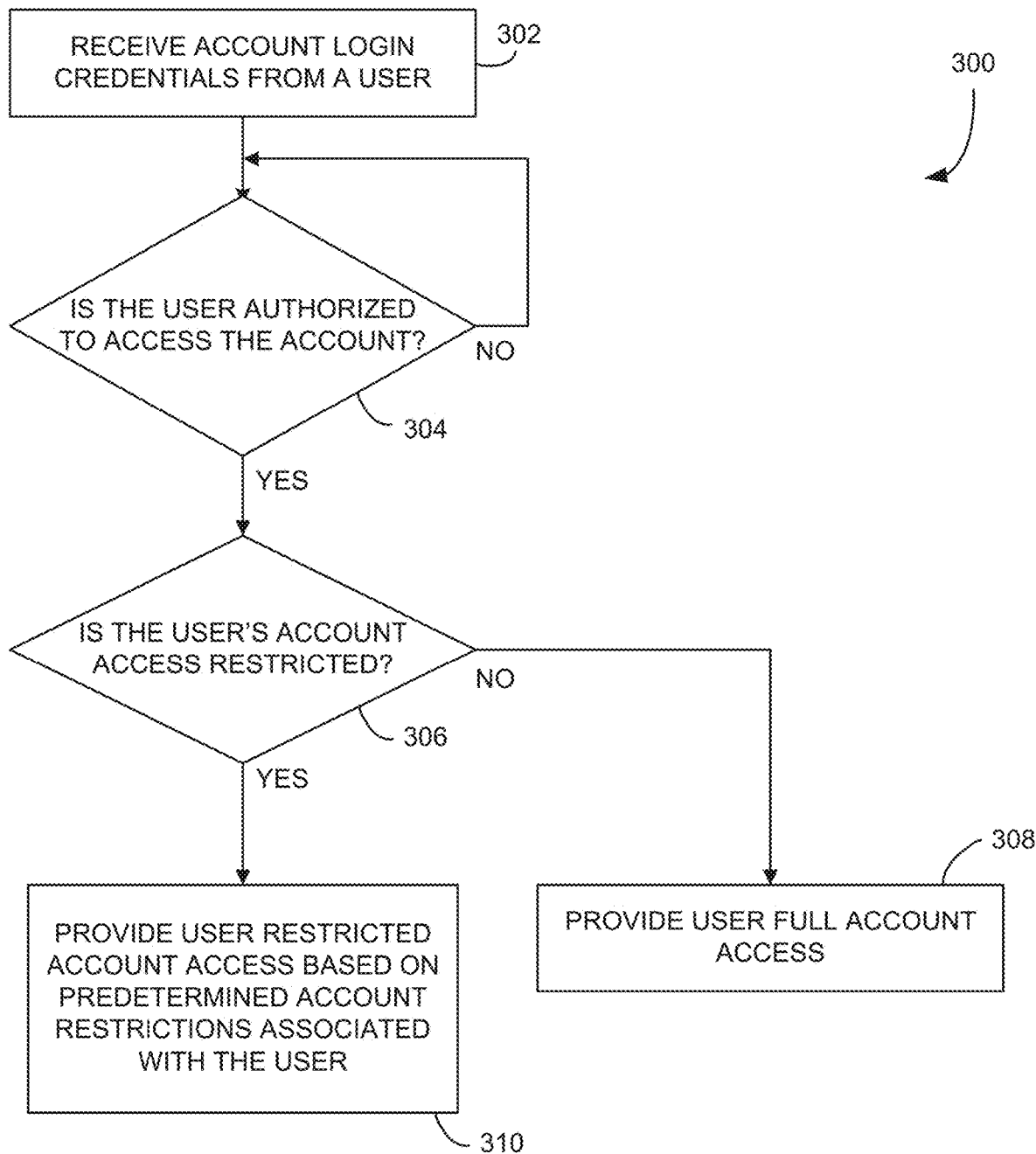
FIG. 3 is a flow diagram of a method of providing restricted account access according to an exemplary embodiment.

Turning to FIG. 3, a flow diagram of a method 300 of providing restricted account access is illustrated in accordance with an exemplary embodiment. For example, the method 300 may be performed by the data processing system 100 of FIG. 1, utilizing the account management logic 110 and the rights management logic 116.

At 302, the rights management logic 116 receives account login credentials from a user. Login credentials may include, for example, a username or an email address, and a password.

At 304, the rights management logic 116 determines if the user is authorized to access an account. To make such a determination, the rights management logic 116 compares the login credentials received at 302 to a database (e.g., the accounts database 126) to determine if there are any accounts associated with the provided username or email address. If there are one or more accounts associated with the username or email address, the rights management logic 116 determines if the user provided the correct password. If the password is correct, the user is authenticated with respect to that account and the method 300 continues to 306.

At 306, the rights management logic 116 determines if the user has restricted access to the account. The rights management logic 116 allows users to provide various levels of account access to other users. For example, some embodiments are configured to facilitate family banking. In these embodiments, an account owner (e.g., a parent) may grant another user (e.g., a child) certain levels of access to an account or to various portions of an account. For example, an account owner may provide access to a certain budget category. In addition, account owners may restrict the information available to certain users. For example, an account owner may hide actual transaction amounts (e.g., dollar amounts) and instead show relative amounts, such as a percentage of a budget category. In another example, an account owner may give another user the ability to view account information (e.g., balances), but not to conduct transactions.

At 308, the rights management logic 116 provides the user full account access if at 306 the user was determined not to have restricted access to the account.

At 310, the rights management logic 116 provides the user restricted access based upon predetermined account restrictions associated with the user if at 306 the user was determined to have restricted access to the account. Thus, the user will be allowed to view the account; however, certain features may be unavailable and/or may be displayed differently based on the restrictions associated with the user. As mentioned above, a parent may provide restricted access to a child in which the child may be granted access to certain budget categories, and/or the child may be restricted from seeing actual dollar amounts of each transaction.

In some embodiments, a user can flag a transaction, for example, to prompt further discussion with other account users. For example, families may share certain accounts. By providing access to multiple users, some or all of the family members can actively manage various family budgets. If one of the users would like to prompt further discussion regarding a particular transaction, the user can flag the transaction, which may send a notice to the other users. For example, a user may realize that frequent transactions at a particular merchant have a significant impact on a budget. By flagging one or more of the transactions, the other users (e.g., the other family members) can be notified of the flag, which can prompt conversation between the users.

Restricted account access can provide valuable financial education for certain users, such as children. For example, by involving children in certain financial decisions, children can learn valuable lessons about budgets and personal finance and they may feel like they are making meaningful contributions to the family. At the same time, children's access can be restricted so they are prevented from engaging in any unauthorized activities and causing any negative financial consequences.

Figure 4:
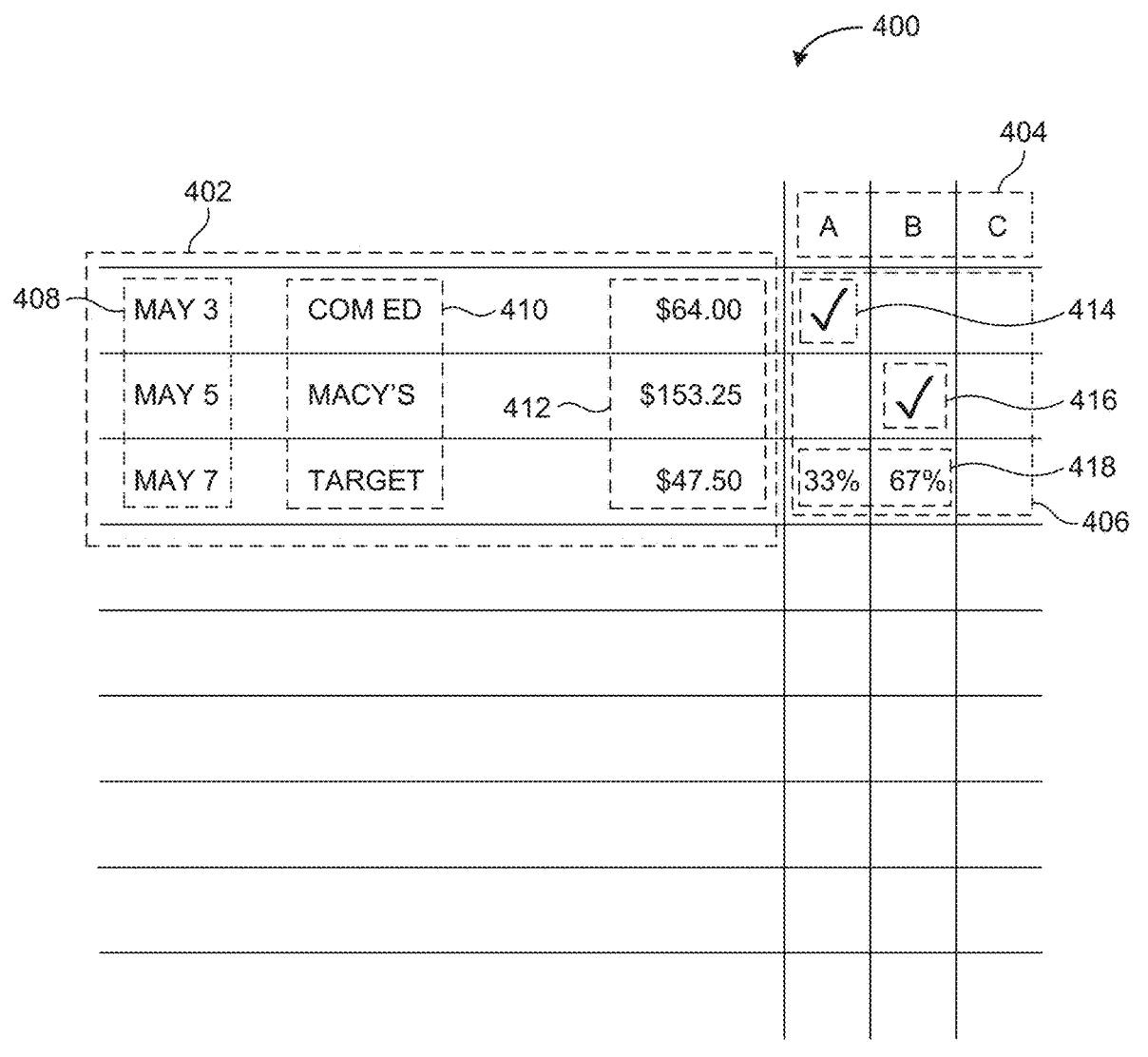

Turning to FIG. 4, a user interface 400 in accordance with an exemplary embodiment is illustrated. For example, the user interface 400 may be displayed on the client device 106 in connection with the data processing system 100 of FIG. 1. As shown in FIG. 4, the user interface 400 provides a simplified visual representation of one or more of the user's financial accounts.

In various embodiments, the user interface 400 may be accessed by a user in numerous ways. In some embodiments, the user interface 400 is accessed by a user through an on-line account section of a website of a financial institution. For example, the user may be a customer of a bank and the user interface 400 may be accessed by a secure on-line banking section of the bank's website and/or through an application running on a mobile device, such a mobile telephone or a tablet computer. In such examples, the user would be granted access to that banking section upon providing a username or email address and a password to verify the user's identity.

The user interface 400 includes transactions 402, budget categories 404, and transaction budget categorizations 406. The transactions 402 represent some or all of the transactions associated with one or more of a user's accounts. In certain embodiments, the transactions are sortable based on date, amount, and/or other fields. The transactions 402 may include, among other things, a date field 408, which represents the date on which the transaction was executed; a merchant field 410, which indicates the other party to the transaction; and an amount field 412, which indicates the amount, or dollar value, of the transaction. In other embodiments, additional fields may be provided.

The budget categories 404 labeled "A," "B," and "C" in FIG. 4 represent three different budget categories. In some embodiments, the budget categories are labeled with more descriptive titles (e.g., "Needs," "Wants," and "Savings") and/or visual representations of each budget category. For example, a "Needs" budget category may be represented by an image of a house, a "Wants" budget category may be represented by an image of an ice cream cone, and a "Savings" category may be represented by an image of a dollar sign.

The transaction budget categorizations 406 represent the one or more budget categories to which each transaction is attributed. In some embodiments, the transaction budget categorizations 406 are selectable by a user by, for example, clicking on a box associated with a transaction and a desired budget category, or by dragging and dropping a transaction onto a box associated with a desired transaction and budget category. For example, a first indicator 414 (e.g., a check mark) indicates that the first transaction is categorized in budget category A. Similarly, a second indicator 416 indicates that the second transaction is categorized in budget category B. To associate a transaction with more than one budget category, a user can simply click on multiple boxes associated with a transaction and each of the desired budget categories. Upon selecting multiple boxes, the user interface may prompt the user to provide an amount or portion of the transaction attributable to each budget category. For example, indicators 418 indicate that 33% of the third transaction is associated with budget category A and 67% of the third transaction is associated with budget category B. In an alternative embodiment, a movable slider bar or other actuatable interface may appear across or near the multiple boxes that can be manipulated by the user to set the relative portions of the transaction attributable to each budget category.

In another embodiment, a category field is included with each transaction. To select a particular budget category, a user can simply click a drop down menu to select a budget category, or simply type the name of a particular budget category in the category field.

In some embodiments, some or all of the transaction budget categorizations 406 are automatically determined by the data processing system 100 (e.g., via the transaction categorization logic 122). In other words, transactions may be automatically categorized or "pre-categorized." For example, in some embodiments, transactions are automatically categorized based on a merchant category or merchant type. For example, the data processing system 100 (e.g., via the transaction categorization logic 122) may automatically categorize transactions at a coffee shop in budget category B (e.g., "Wants"). Further, in some embodiments, the transactions may be automatically categorized based on prior manual categorizations by a user. For example, after a predetermined number of transactions having certain attributes (e.g., merchant, merchant category, amount, time, date, etc.) have been manually categorized, subsequent transactions having those same certain attributes may be automatically categorized based on the manual categorizations. In other words, the data processing system 100 may be configured to "learn" from users' prior usage and categorization history.

After a transaction has been automatically categorized, a user may manually adjust the category or "re-categorize" the transaction if he or she disagrees with the automatically selected categorization. For example, a transaction at a coffee shop may be automatically categorized in budget category B (e.g., "Wants"). However, the user may disagree with the categorization and may manually change the categorization to budget category A (e.g., "Needs") or, for example, may categorize 50% of the transaction in budget category A and 50% of the transaction in budget category B. As another example, all of a user's transactions at a coffee shop may be automatically categorized in budget category B. However, the user may manually re-categorize transactions that occurred in the morning in budget category A and may leave the transactions that occurred in the afternoon in budget category B. The data processing system 100 (e.g., via the transaction categorization logic 122) may recognize patterns such as these to "learn" from the user's manual re-categorization and usage history to improve future automatic categorizations.

Figure 5B:
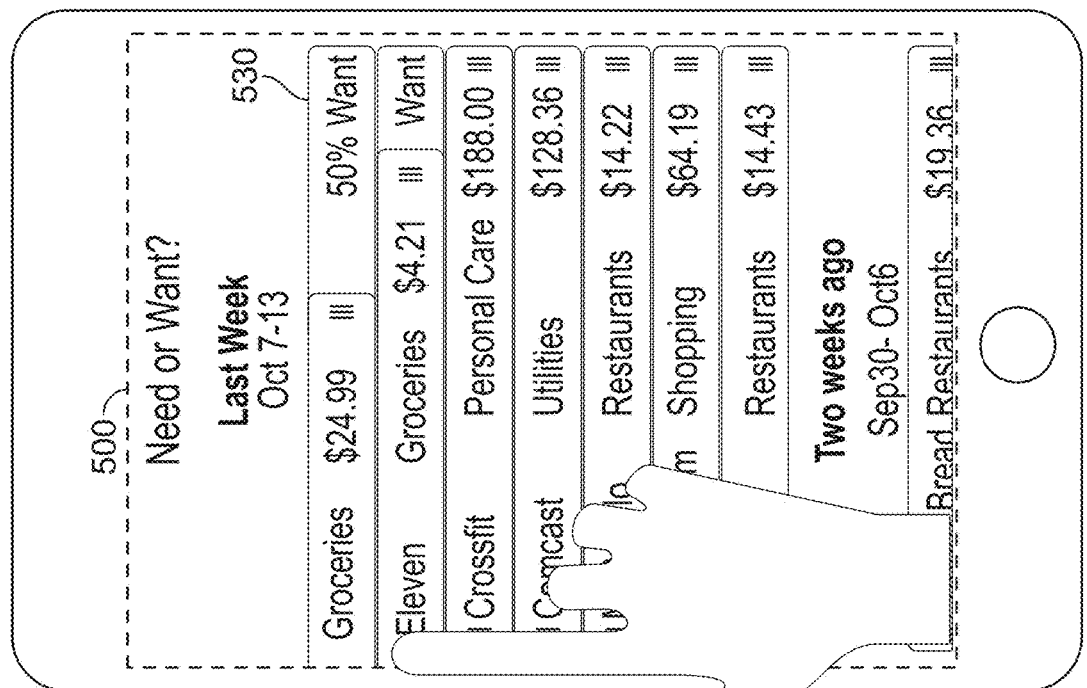
FIGS. 5A and 5B illustrate a user interface to categorize financial transactions according to an exemplary embodiment.
Figure 5A:
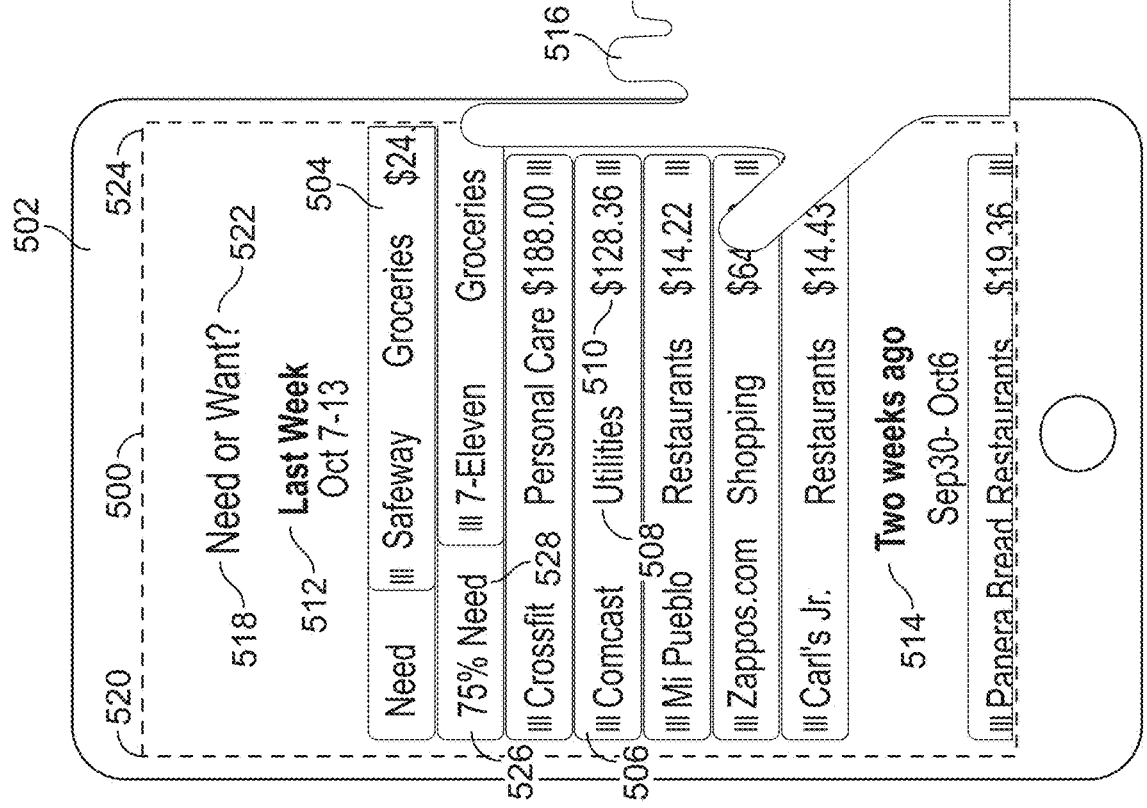

FIG. 5A illustrates a user interface 500 displayed on a device 502 in accordance with an exemplary embodiment. For example, the user interface 500 may also be configured to be displayed on the client device 106 in connection with the data processing system 100 of FIG. 1. As shown in FIG. 5A, the user interface 500 provides a simplified visual representation of transactions associated with one or more of a user's financial accounts. In various embodiments, the user interface 500 may be accessed by a user in similar ways as those described above in connection with the user interface 400 of FIG. 4. The user interface 500 is particularly suitable for use on touch screen devices such as tablet computers and mobile telephones due to the large and easy to select items, as will be explained in further detail below. However, the features and functionality of the user interface 500 may be implemented on any device.

The user interface 500 includes transactions 504 that are associated with one or more of the user's financial accounts. Each of the transactions 504 is represented as an interactive slider. The sliders may include various information relating to the respective transactions, such as a merchant name 506, a subcategory 508, and an amount 510, among other things. In other embodiments, additional fields may be provided. In some embodiments, subcategories may be automatically determined (e.g., by the transaction categorization logic 122 of FIG. 1) based on, for example, metadata associated with the transactions. The transactions 504 may be separated based on a time period in which the transactions occurred. For example, the user interface 500 separates transactions into a first time period 512 (e.g., last week) and a second time period 514 (e.g., two weeks ago).

The transactions 504 may be graphically displayed as sliders that may be slid, dragged, or "flicked" by a user 516 to categorize the transactions into a first budget category 518 (e.g., "Need") associated with a first (e.g., left) side 520 of the user interface 500 or a second budget category 522 (e.g., "Want") associated with a second (e.g., right) side 524 of the user interface 500. For example, a transaction 504 may be slid or flicked all the way towards the first side 520 of the user interface 500 to categorize the transaction 504 in the first budget category 518.

The transactions 504 may also be partially categorized into each of the first and second budget categories 518, 522. For example, as shown in FIG. 5A, a second transaction 526 is being dragged by the user 516 to partially categorize it in each of the first and second budget categories 518, 522. The second transaction 526 may be partially categorized within each of the first and second budget categories 518, 522 according to the relative amount that the user 516 slides the second transaction 526 towards either of the first or second sides 520, 524 of the user interface 500. Upon sliding a transaction 504 towards the first or second sides 520, 524 of the user interface 500, a categorization indicator 528 is revealed. The categorization indicator 528 may include a color and/or text describing the categorization. For example, as shown in FIG. 5A, the second transaction 526 is being dragged approximately 25% of the way towards the second side 524 to categorize the second transaction as 25% in the second budget category 522. Thus, the categorization indicator 528 is revealed to show that the second transaction 526 is being categorized as "75% Need" and, in other words, as 75% in the first budget category 518. Therefore, 25% of the amount of the second transaction 526 will be attributed to the second (e.g., "Want") budget category 522 and 75% of the amount of the second transaction 526 will be attributed to the first (e.g., "Need") budget category 518.

In some embodiments, the transactions 504 may be automatically categorized or "pre-categorized" in one or more of the first and second budget categories 518, 522 based on a user's prior usage or categorization history. For example, the user interface 500 may "suggest" categorizations for each of a user's transactions by pre-positioning the sliders of each of the transactions 504. In some embodiments, a user may verify the "pre-categorized" or "suggested" categorizations by tapping the transaction 504, or in other ways.

Turning to FIG. 5B, the user interface 500 of FIG. 5A is shown with different transaction categorizations. As shown in FIG. 5B, a first transaction 530 is partially categorized within each of the first and second budget categories 518, 522. More specifically, the user 516 has dragged the first transaction 530 so that the slider is halfway towards the first side 520. Therefore, the first transaction 530 is categorized as 50% in the first budget category 518 (e.g., "50% Need") and 50% in the second budget category 522 (e.g., "50% Want"). Thus, 50% of the amount of the first transaction 530 will be attributed to the first (e.g., "Need") budget category 518 and 50% of the amount of the first transaction 530 will be attributed to the second (e.g., "Want") budget category.

Figure 6C:
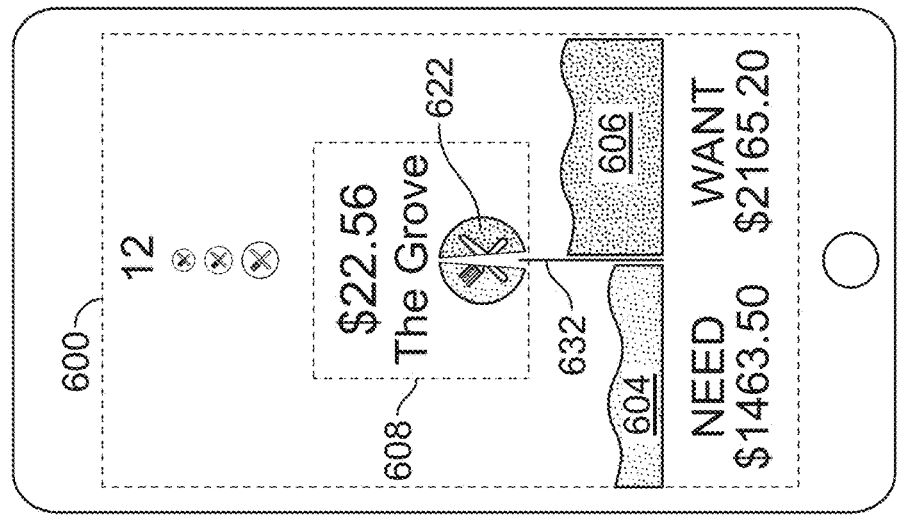
FIGS. 6A-6C illustrate a user interface to categorize financial transactions according to an exemplary embodiment.
Figure 6B:
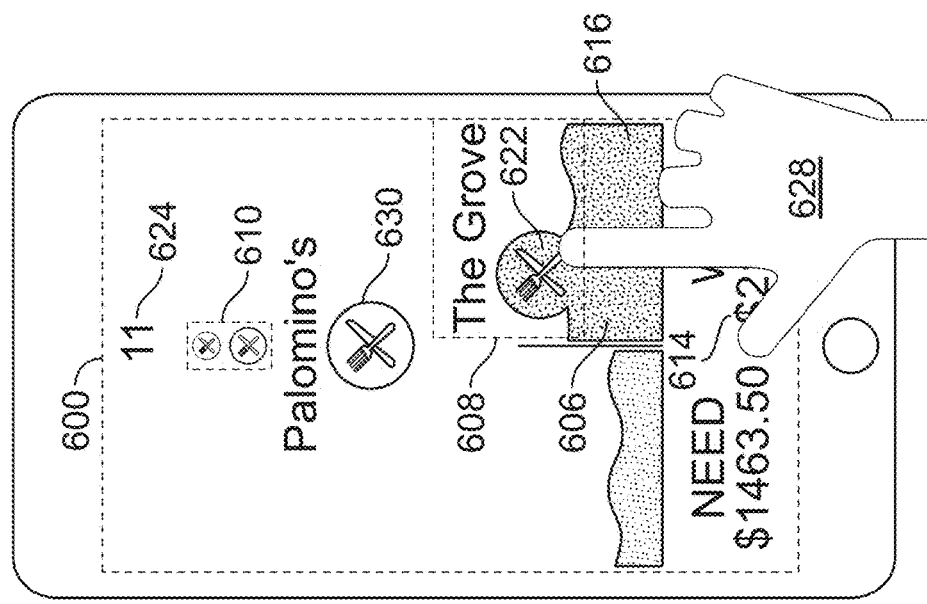
Figure 6A:
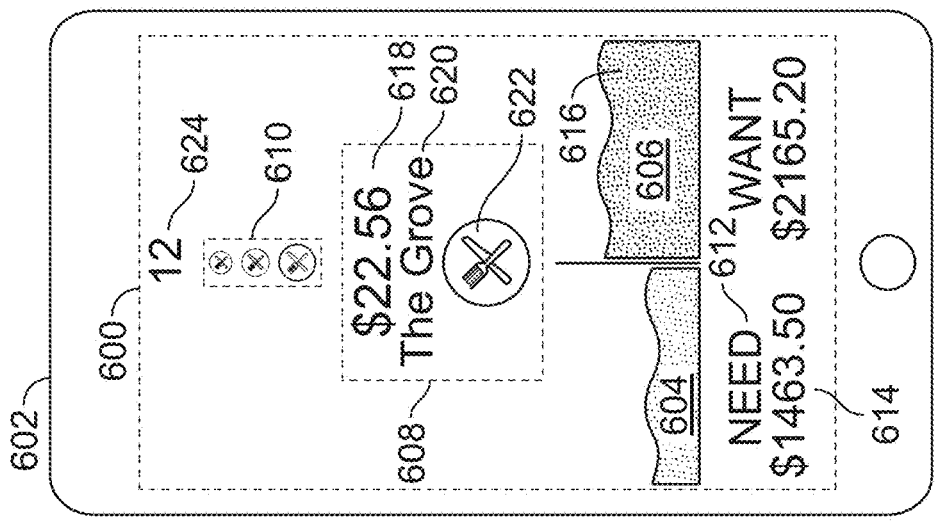

Turning to FIG. 6A-6C, a user interface 600 is shown as displayed on a device 602 in accordance with another exemplary embodiment. In various embodiments, the user interface 600 may be accessed by a user in similar ways as described above in connection with the user interfaces 400 and 500 of FIGS. 4-5B. In some embodiments, the user interface 600 is configured to allow a user to easily categorize transactions into one or more budget categories.

The user interface 600 includes a first budget category 604 (e.g., "Need") and a second budget category 606 (e.g., "Want"). In some embodiments, transactions, such as a first transaction 608 and additional transactions 610 can be dragged into one or both of the first and second budget categories 604, 606 to categorize the transactions therein. In the embodiment shown in FIGS. 6A-6C, the user interface 600 includes two budget categories. However, other embodiments may include more than two budget categories and/or customized budget categories.

Each of the first and second budget categories 604, 606 includes an identifier 612 (e.g., "Need" or "Want") and a total amount 614, which represents the sum of the amounts of the transactions that have been categorized within the respective budget category. Each of the first and second budget categories 604, 606 also includes a fill area 616, which visually represents the total amount 614. The fill area 616 increases (e.g., more color is filled in) as additional transactions are categorized.

The first transaction 608 includes various information relating to the transaction, such as an amount 618, a merchant name 620, and an icon 622, which may represent a subcategory of the first transaction 608. As with the user interface 500 of FIGS. 5A-5B, the subcategories may be automatically determined in certain embodiments (e.g., by the transaction categorization logic 122 of FIG. 1), for example, based on metadata associated with the transactions. For example, the transaction categorization logic 122 of FIG. 1 may automatically recognize that transactions with The Grove should be subcategorized as Restaurants. Thus, the icon 622 includes a knife and fork to represent the Restaurants subcategory. A user may categorize one transaction at a time. The additional transactions 610 represent transactions that the user will categorize after categorizing the first transaction 608. The additional transactions 610 may include less information than the first transaction 608 in order to maintain a clean and uncluttered interface. For example, the additional transactions 610 may include the icon 622 but not the amount 618 or the merchant name 620. In some embodiments, information such as the amount 618 and/or the merchant name 620 may be displayed only when each of the additional transactions 610 are positioned to be categorized. The user interface 600 may further include a counter 624 representing the number of remaining transactions that have yet to be categorized.

Turning to FIG. 6B, the user interface 600 of FIG. 6A is shown as a user 628 categorizes the first transaction 608. In particular, the user 628 is categorizing the first transaction 608 into the second budget category 606 by dragging the icon 622 of the first transaction 608 into the second budget category 606 and, more specifically, into the fill area 616 of the second budget category 606. In some embodiments, the first and second budget categories 604, 606 are displayed in different colors. As the first transaction 608 is being dragged towards the second budget category, the first transaction 608 may change its color to match the color of the second budget category 606. Upon categorizing the first transaction 608 into the second budget category 606, the total amount 614 of the second category and the fill area 616 are increased according to the amount of the first transaction 608. In addition, the additional transactions 610 are advanced such that the next one 630 of the additional transactions 610 is positioned to be categorized and the counter 624 is decremented.

In some embodiments, the user interface 600 may position the first transaction 608 or each of the first transaction 608 and the additional transactions 610 above one or more of the first and second budget categories 604, 606 to automatically "pre-categorize" or "suggest" categorization of the respective transactions based on a user's prior usage or categorization history. For example, the user interface 600 may automatically position the icon 622 of the first transaction 608 above the second budget category 606 if the user interface 600 predicts that the user will categorize the first transaction 608 in the second budget category 606.

In FIG. 6C, the first transaction 608 is shown being categorized into both of the first and second budget categories 604, 606. The icon 622 of the first transaction 608 is dragged onto a barrier 632 that separates the first and the second budgeting categories 604, 606. Upon doing so, the icon 622 is shown as being split between the first and the second budget categories 604, 606, with respective split portions of the icon 622 colored to match the corresponding budget categories. Thus, a portion of the amount of the first transaction 608 will be attributed to each of the first and second budget categories 604, 606. For example, the first transaction 608 may be split between the first and second budget categories 604, 606 according to the position of the icon 622 on the barrier 632 with respect to the first and second budget categories 604, 606.

FIGS. 7-13 illustrate user interfaces of various exemplary embodiments that may be displayed in connection with the data processing system 100 of FIG. 1 and any of the other user interfaces described herein. The user interfaces of FIGS. 7-13 provide, in various embodiments, visual overviews of an amount of each respective budget category that has been attributed to transactions and the amount remaining for a particular time period. For example, in one embodiment, the user interfaces of FIGS. 7-13 may be displayed as an interstitial page when a person selects a "budget" portion of the user's bank account webpage. In another embodiment, the user interfaces of FIGS. 7-13 may be displayed in conjunction with the transaction categorization user interfaces 400, 500, or 600 of FIGS. 4-6C, in conjunction with other interfaces, or in a widget.

Figure 7:
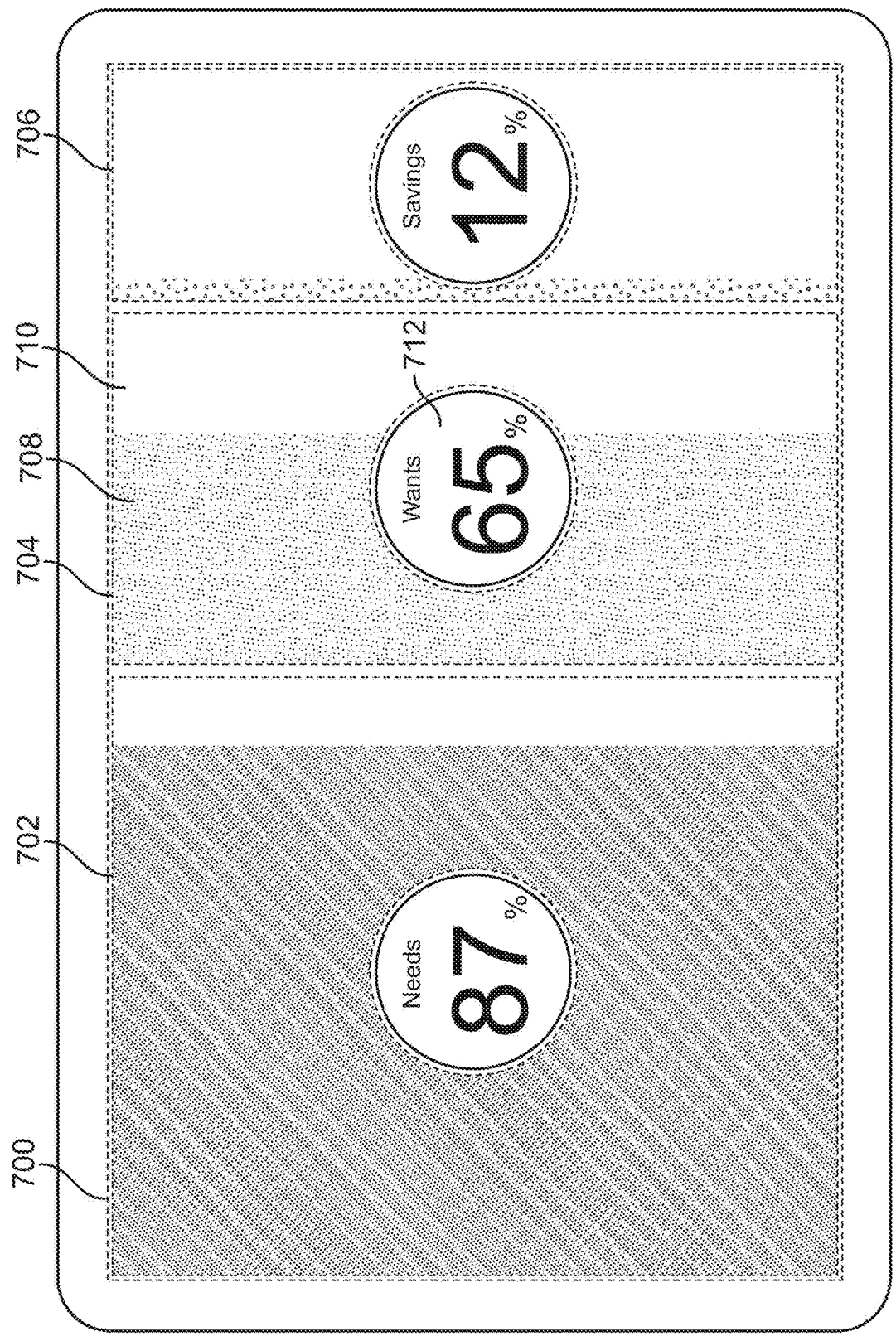
FIGS. 7-16 illustrate various user interfaces to display budget overviews according to various exemplary embodiments.

The user interface 700 of FIG. 7 includes three sections representing a first budget category 702 (e.g., "Needs"), a second budget category 704 (e.g., "Wants"), and a third budget category 706 (e.g., "Savings"). Each of the first, second, and third budget categories 702, 704, 706 includes a shaded portion 708 and an unshaded portion 710. The shaded portion 708 represents the amount of the respective budget category encompassed by transactions that have been categorized thereto, and the unshaded portion 710 represents the remainder of the respective budget category. Each of the first, second, and third budget categories 702, 704, 706 may also include an icon 712 that includes a title of the respective category and a numerical indication of the amount of the respective budget category attributed to transactions. For example, a user may have a total budget amount of $10,000 for a particular time period, with 50% ($5,000) allotted to the first budget category 702, 30% ($3,000) allotted to the second budget category 704, and 20% ($2,000) allotted to the third budget category 706. In the exemplary embodiment of FIG. 7, the user has categorized transactions amounting to $4,350 (87% of 5,000) to the first budget category 702, transactions amounting to $1,950 (65% of $3,000) to the second budget category 704, and transactions amounting to $240 (12% of $2,000) to the third budget category 706. Thus, FIG. 7 provides a convenient visual indication to the user of the amount of each respective budget category that is remaining for a particular time period.

Figure 8:
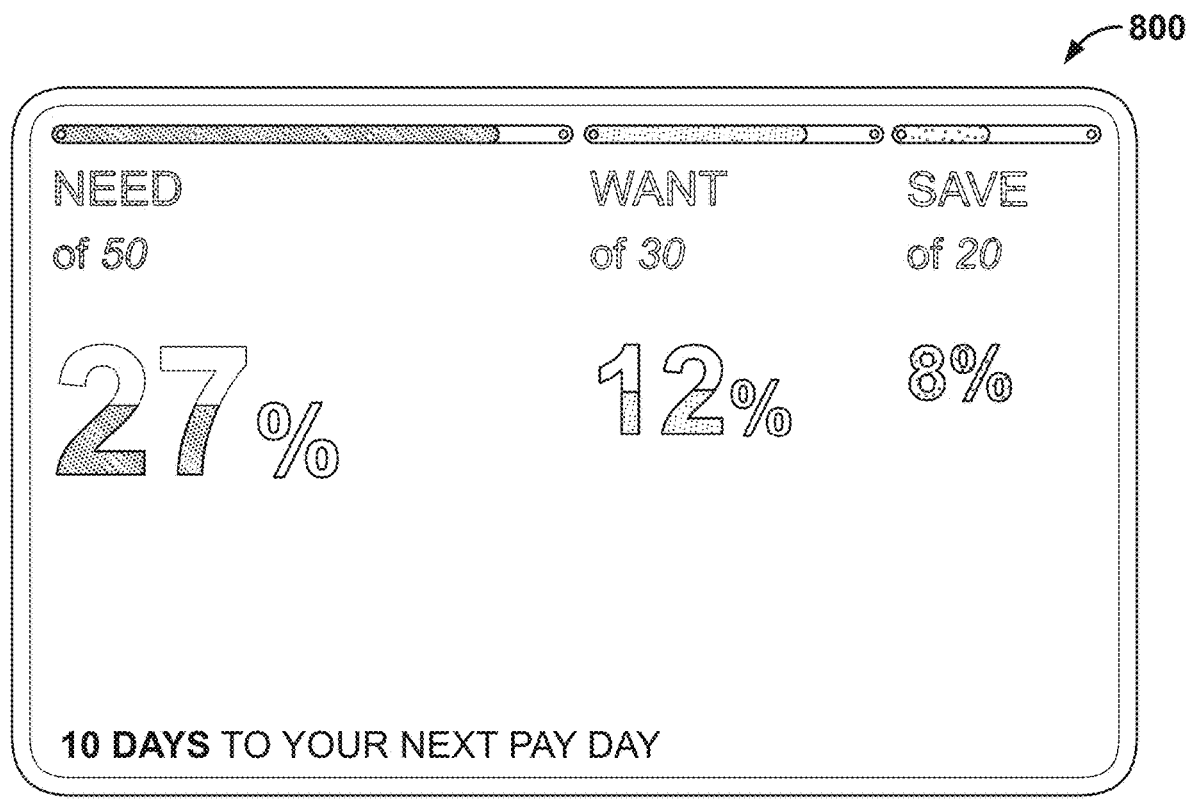
Figure 9:
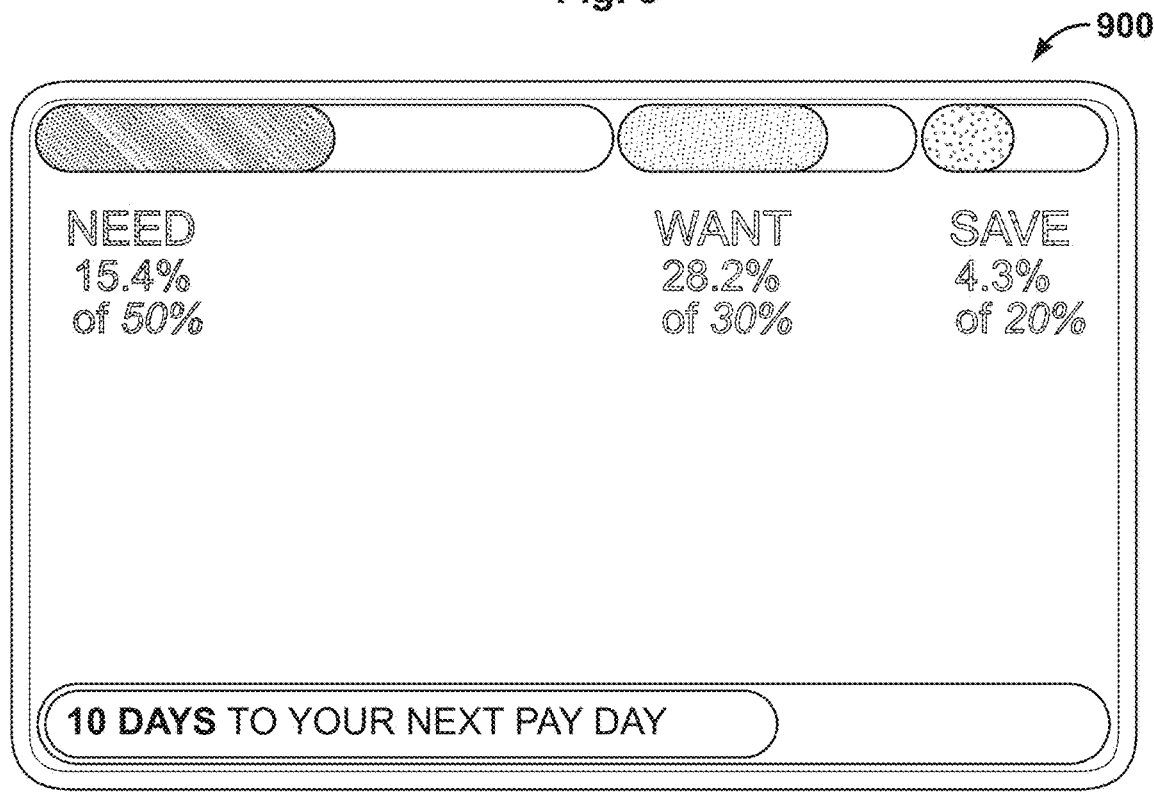

FIG. 8 illustrates a user interface 800 according to another exemplary embodiment. The user interface 800 provides an overview of a budget that may be tracked based on periods defined by the dates that a user is paid. As with the embodiment of FIG. 7, the user interface 800 provides a visual overview of the amount of each respective budget category that has been attributed to transactions and the amount remaining for a particular time period. For example, the user interface 800 indicates that 27% of a first budget category (e.g., "Need"), which represents 50% of a total budget amount, has been attributed to transactions. Accordingly, the text of "27%" is darkened according to the percentage of that respective category that has been attributed to transactions. In other words, 27% is slightly more than half of 50%, so the text of "27%" is darkened slightly more than halfway from the bottom. The user interface 800 further includes a message relating to the time period associated with the budgets, stating "10 DAYS TO YOUR NEXT PAY DAY."

Figure 10:
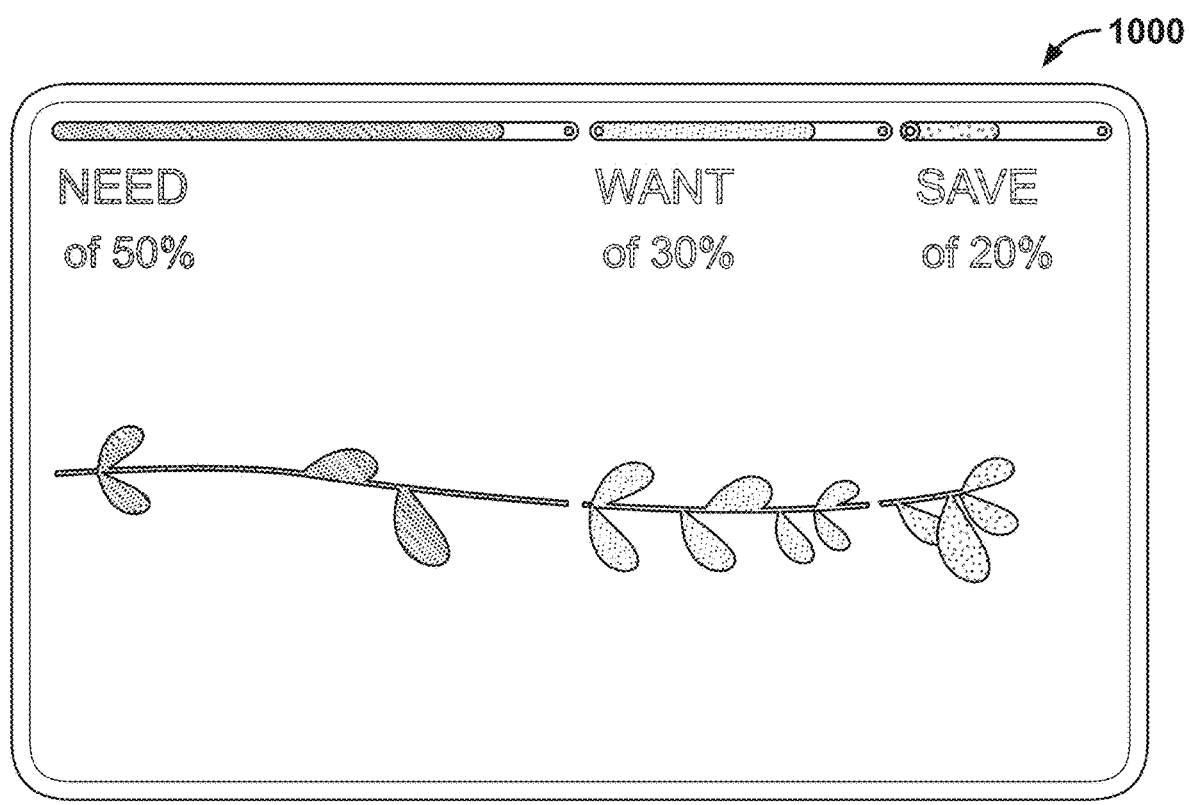
Figure 11:
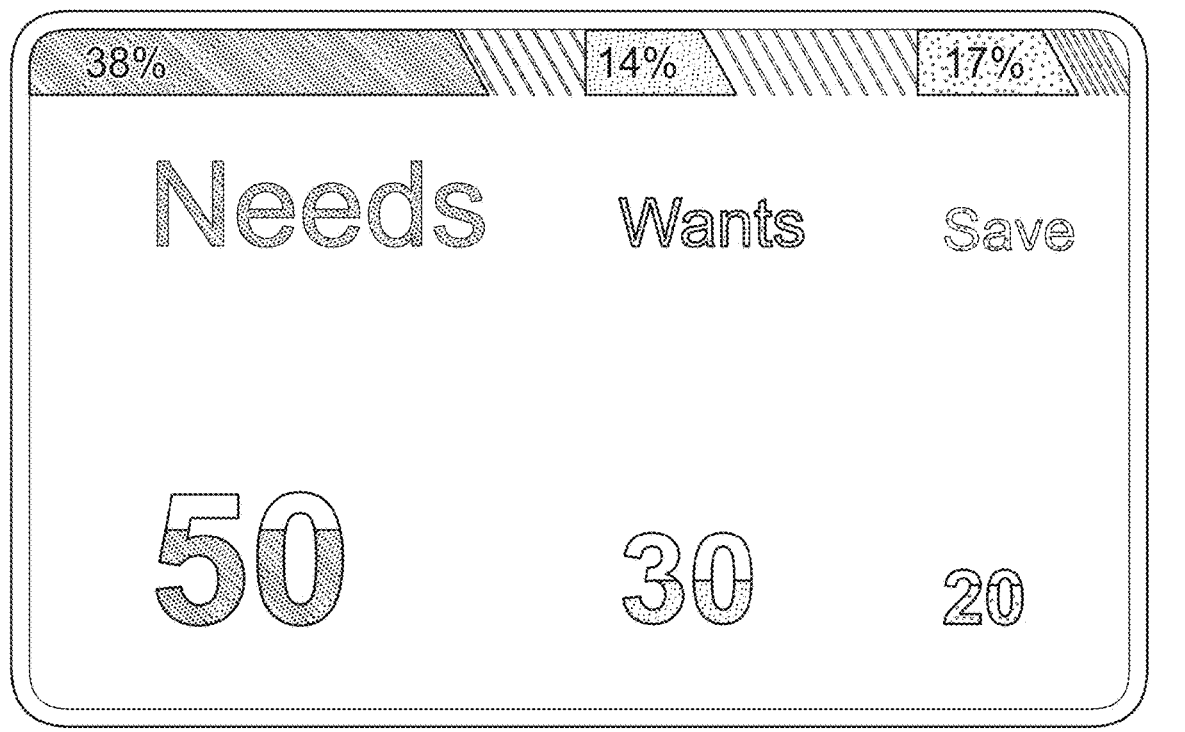
Figure 12:
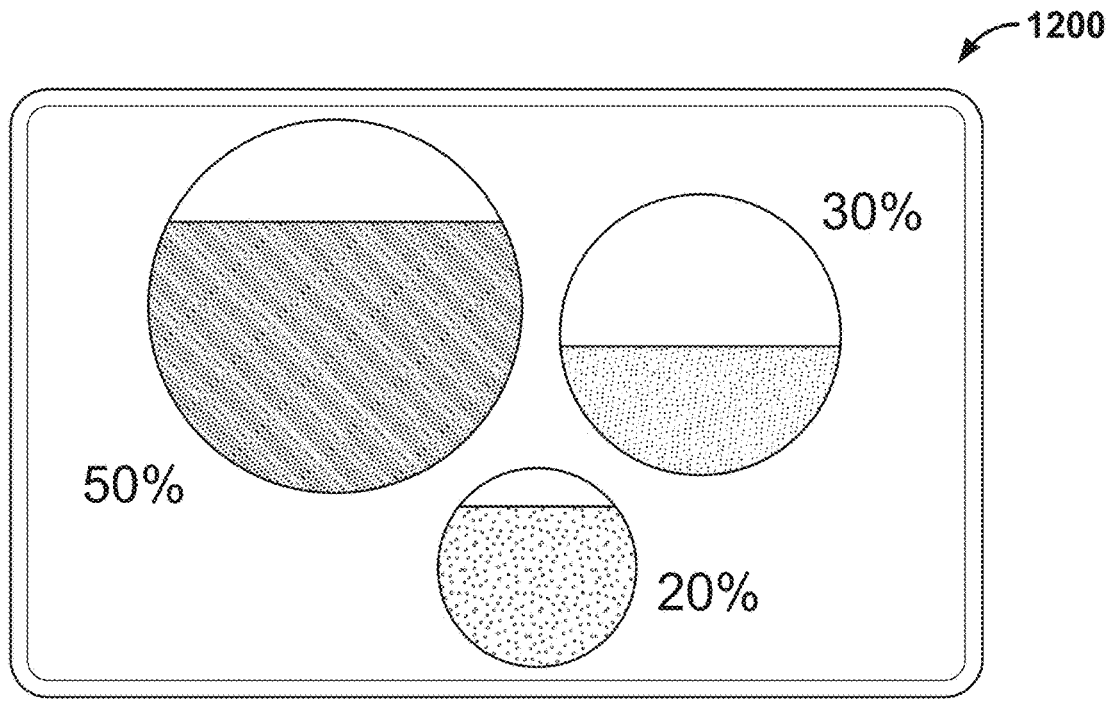
Figure 13:
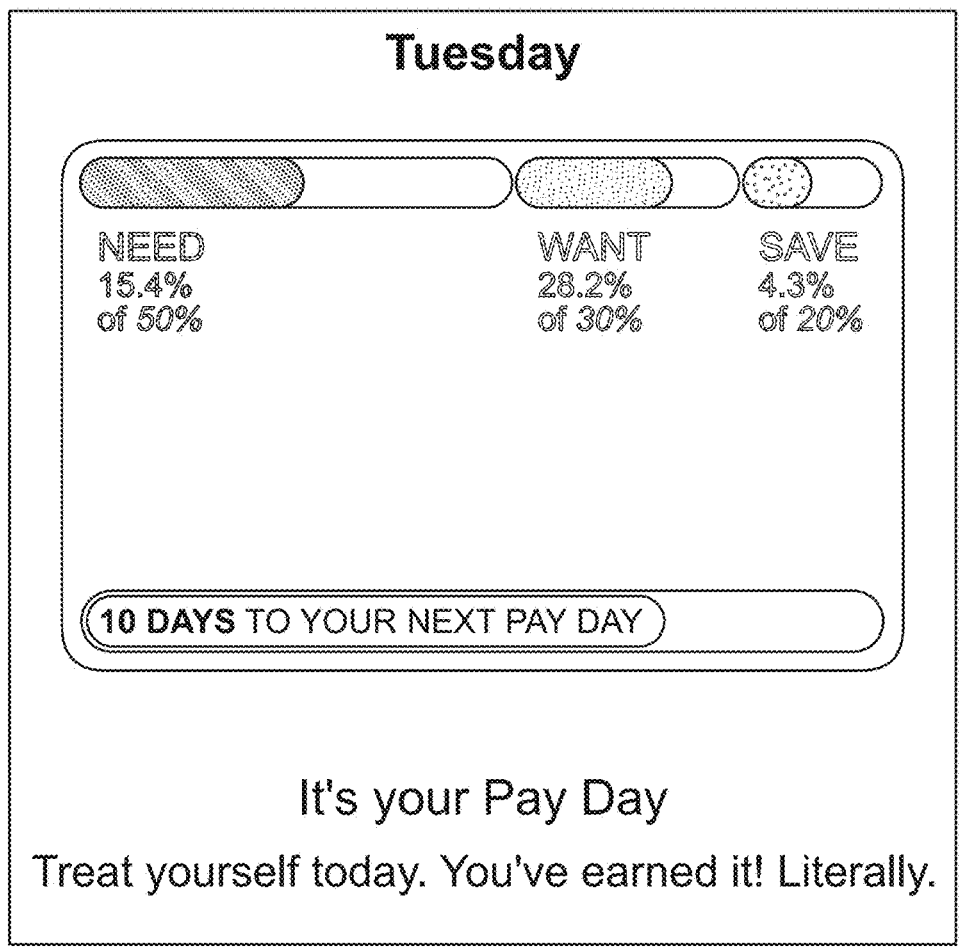

FIGS. 9-13 illustrate user interfaces according to additional exemplary embodiments that display budget overviews in different ways. User interface 900 of FIG. 9 includes bars for each budget category that are darkened based on amounts of the transactions attributed to the respective budget categories. User interface 1000 of FIG. 10 illustrates a plant that loses leaves in different areas based on amounts of the transactions attributed to the corresponding budget categories. User interface 1100 of FIG. 11 illustrates numbers that are darkened based on the amounts of the transactions attributed to the respective budget categories. User interface 1200 of FIG. 12 illustrates shapes that are darkened, or filled up, based on the amounts of the transactions attributed to the respective budget categories. User interface 1300 of FIG. 13 illustrates the user interface 900 of FIG. 9 with a message based on a budget being met for a time period. For example, the user of the user interface 1300 may be under budget for each of the budget categories. The user interface notifies the user that it is the user's payday and that the user can afford to treat themselves.

Figure 14:
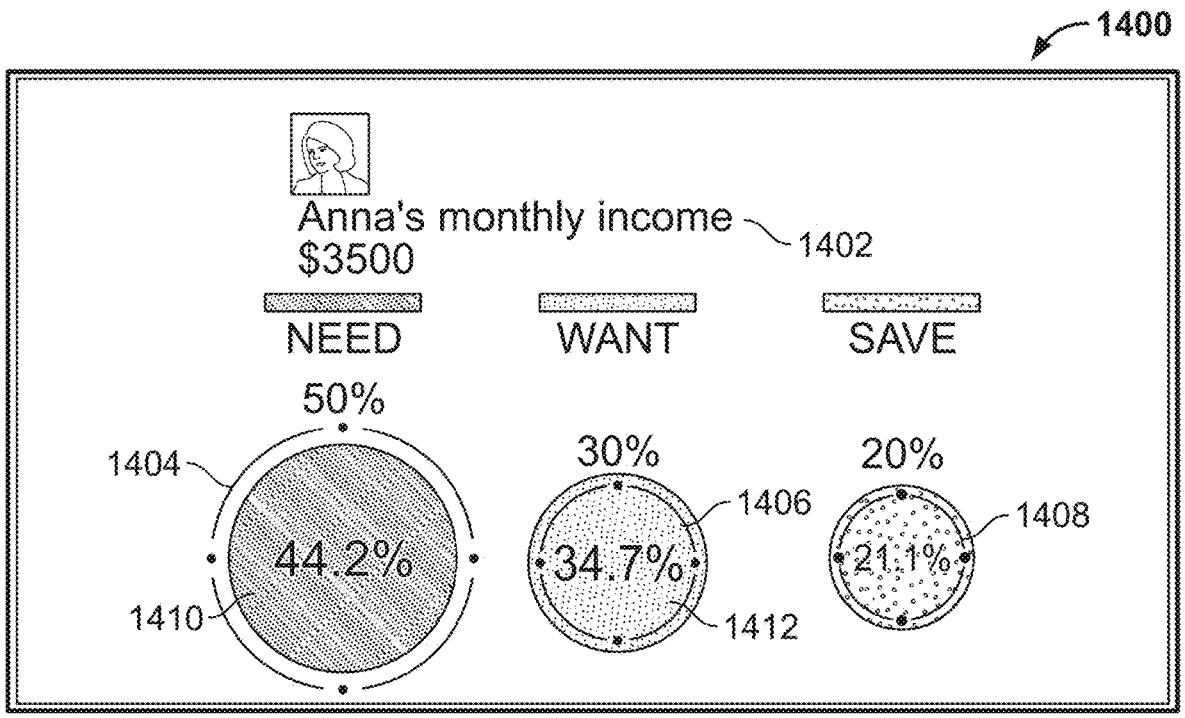

FIG. 14 illustrates a user interface 1400 according to another exemplary embodiment. The user interface 1400 may be displayed in connection with the data processing system 100 of FIG. 1 and any of the other user interfaces described herein. According to one embodiment, the user interface 1400 may provide an overview of a user's financial activity with respect to three budget categories (e.g., "Need," "Want," and "Save") over a time period. The user interface 1400 includes a total budget amount 1402. As shown in FIG. 14, the total budget amount 1402 specifies that the user's (Anna's) monthly income was $3,400. The user interface 1400 is illustrated with respect to a time period of one month.

In some embodiments, budget categories may be provided as shapes sized in proportion to their respective budgeted amounts. In one embodiment, as shown in FIG. 14, the budget categories, such as a first budget category 1404 (e.g., "Need"), a second budget category 1406 (e.g., "Want"), and a third budget category 1408 ("Save"), which are shown with circular outlines. Each of the budget categories includes a fill area, such as a first fill area 1410 of the first budget category 1404. The fill area represents the actual total amount or dollar value of the transactions attributed to the respective budget category over the time period, and may further include a numerical representation thereof. For example, if the budget category and the fill area are the same size, then the budgeted amount for the budget category equals the amount of the transactions attributed to that budget category over the time period. If the fill area is larger than the budget category, then the budgeted amount for that budget category was exceeded by the amount of the transactions attributed to that budget category over the time period. For example, as shown in FIG. 14, the first budget category 1404 has a budgeted amount of 50% of the total budget and the first fill area 1410 represents 44.2% of the total budgeted amount. Therefore, the first fill area 1410 is smaller than the first budget category 1404. However, a second budget category 1406 has a budgeted amount of 30% of the total budgeted amount and a second fill area 1412 represents 34.7% of the total budgeted amount. Therefore, the second fill area 1412 is larger than the second budget category 1406 and, thus, the budgeted amount of the second budget category 1406 was exceeded for that time period.

Figure 15:
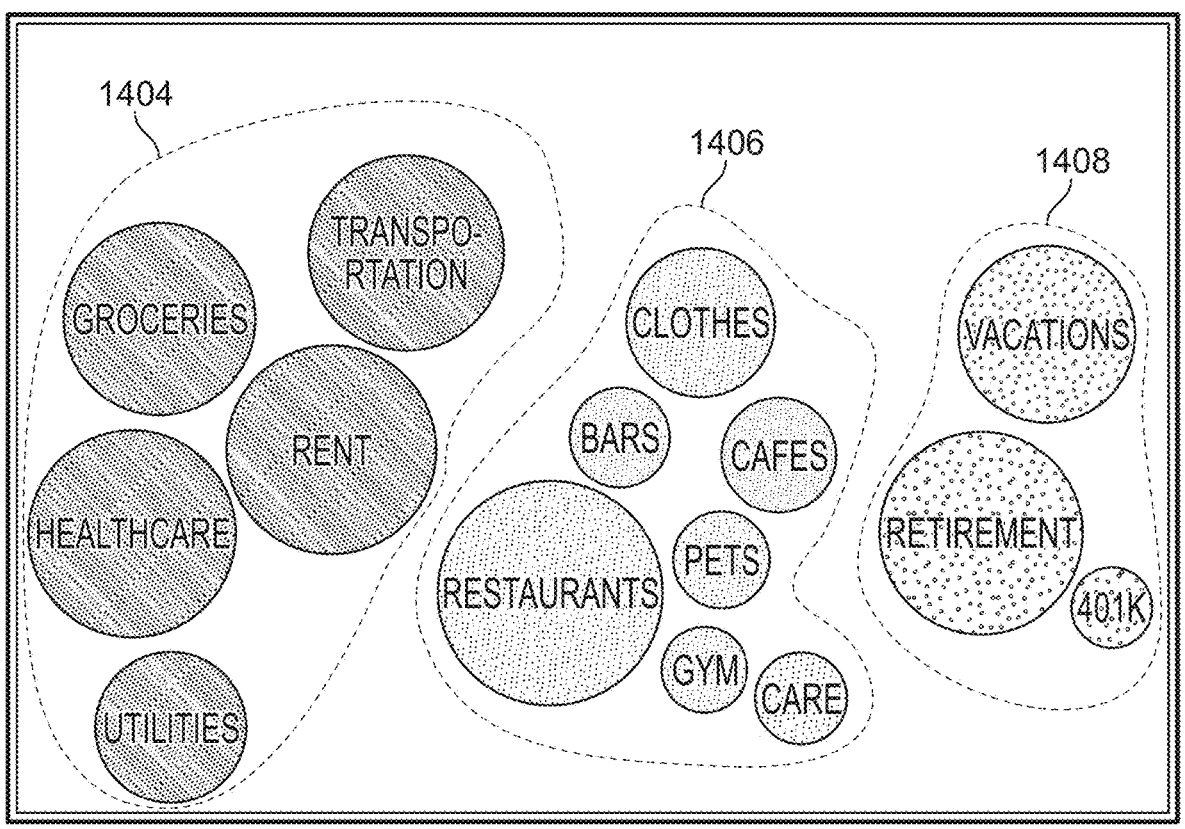

Turning to FIG. 15, a user interface 1500 is illustrated according to another exemplary embodiment. According to one embodiment, the user interface 1500 provides a visual representation of the subcategories that make up each of the first, second, and third budget categories 1404, 1406, 1408 of FIG. 14. In one embodiment, the subcategories making up each of the first, second and third budget categories 1404, 1406, and 1408 may be displayed as a treemap or bubble map, where each subcategory is represented by a circle that is sized in proportion to the total amount of the transactions categorized in the respective subcategory. In various embodiments, the personal financial management logic 118 may leverage any of various treemapping algorithms to generate the user interface 1500. The subcategories making up each of the first, second and third budget categories 1404, 1406, and 1408 may be positioned near each other, shown in the same color, and or identified in any of various ways to identify their respective budget categories. The user interface 1400 can provide valuable insights to a user regarding their personal finances by allowing a user to easily compare spending in certain categories and subcategories relative to other categories and subcategories. For example, a user may easily see that he or she is spending more on bars than he or she is on retirement. Accordingly, the user may desire to readjust certain priorities after becoming aware of such spending habits.

Figure 16:
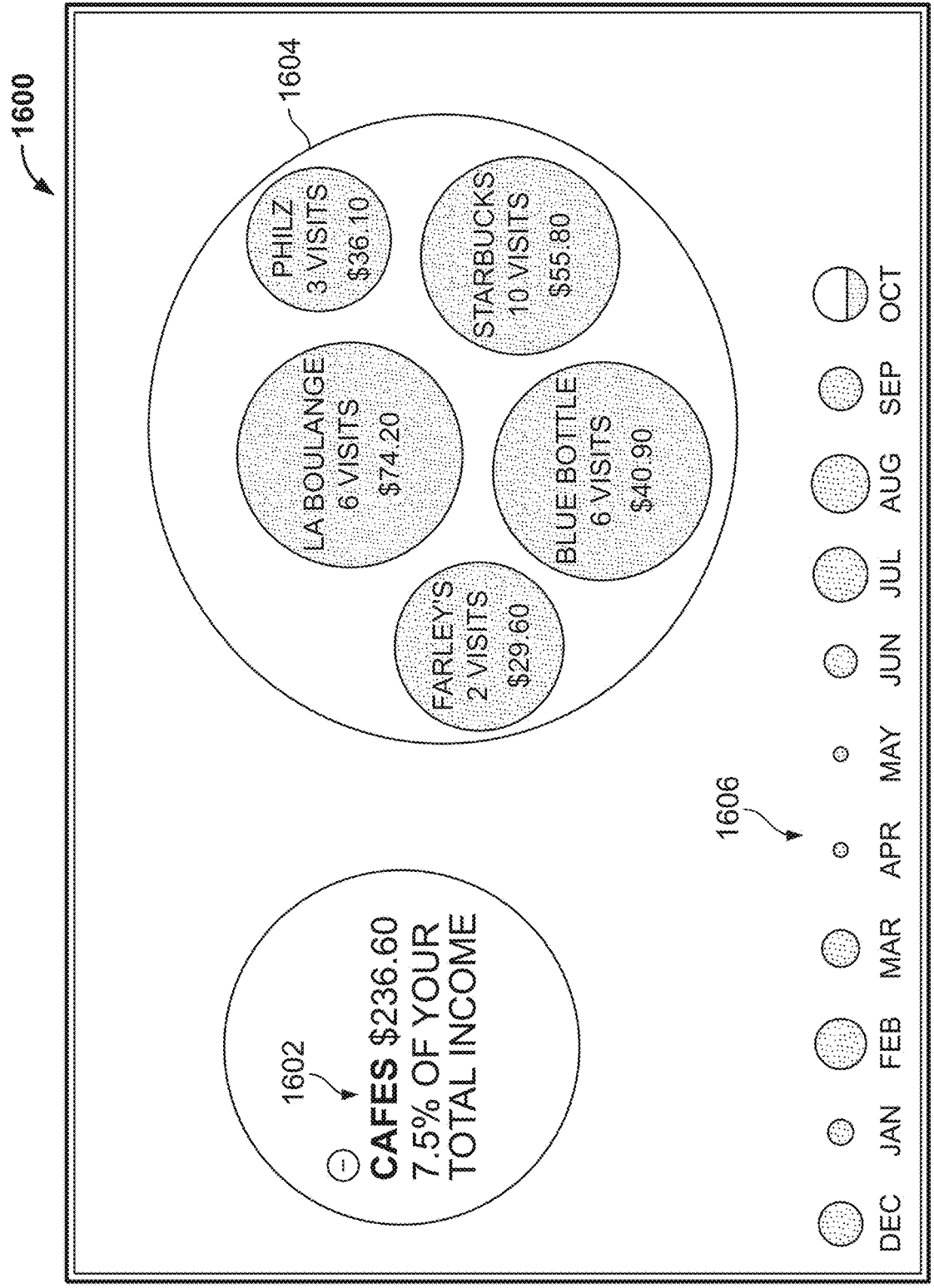

FIG. 16 is another user interface 1600 that illustrates transactions within a subcategory according to an exemplary embodiment. For example, in one embodiment, the user interface 1600 may be accessed by selecting the "Café" subcategory on the user interface 1500 of FIG. 15. The user interface 1600 includes a summary section 1602, which may include, among other things, the subcategory name, the amount attributed to the subcategory, and the percentage of a total budgeted amount (e.g., total income) attributed to the subcategory.

According to one embodiment, the user interface 1600 may also include a treemap 1604 including the most significant merchants corresponding to the transactions within the subcategory. For example, the treemap 1604 illustrates various merchants such as La Boulange, Starbucks, Blue Bottle, and others. Each merchant is represented by a circle sized in proportion to the amount of the transactions with the respective merchants. The circles for each merchant that are displayed in the treemap 1604 may include additional information, such as amount of the transactions with the respective merchant and a transaction count, or number of visits, with each respective merchant. The treemap 1604 may allow a user to identify if certain merchants within a subcategory significantly affect their various budgets.

The user interface 1600 may further include a spending history section 1606. The spending history section 1606 may include, for past time periods (e.g., months), shapes that are sized in proportion to spending in that subcategory for those past time periods. Thus, a user can see how his or her spending in specific subcategories changes over time. In one embodiment, the final shape may be sized according to a predicted total for the current time period and filled according to a present total.

Figure 17A:
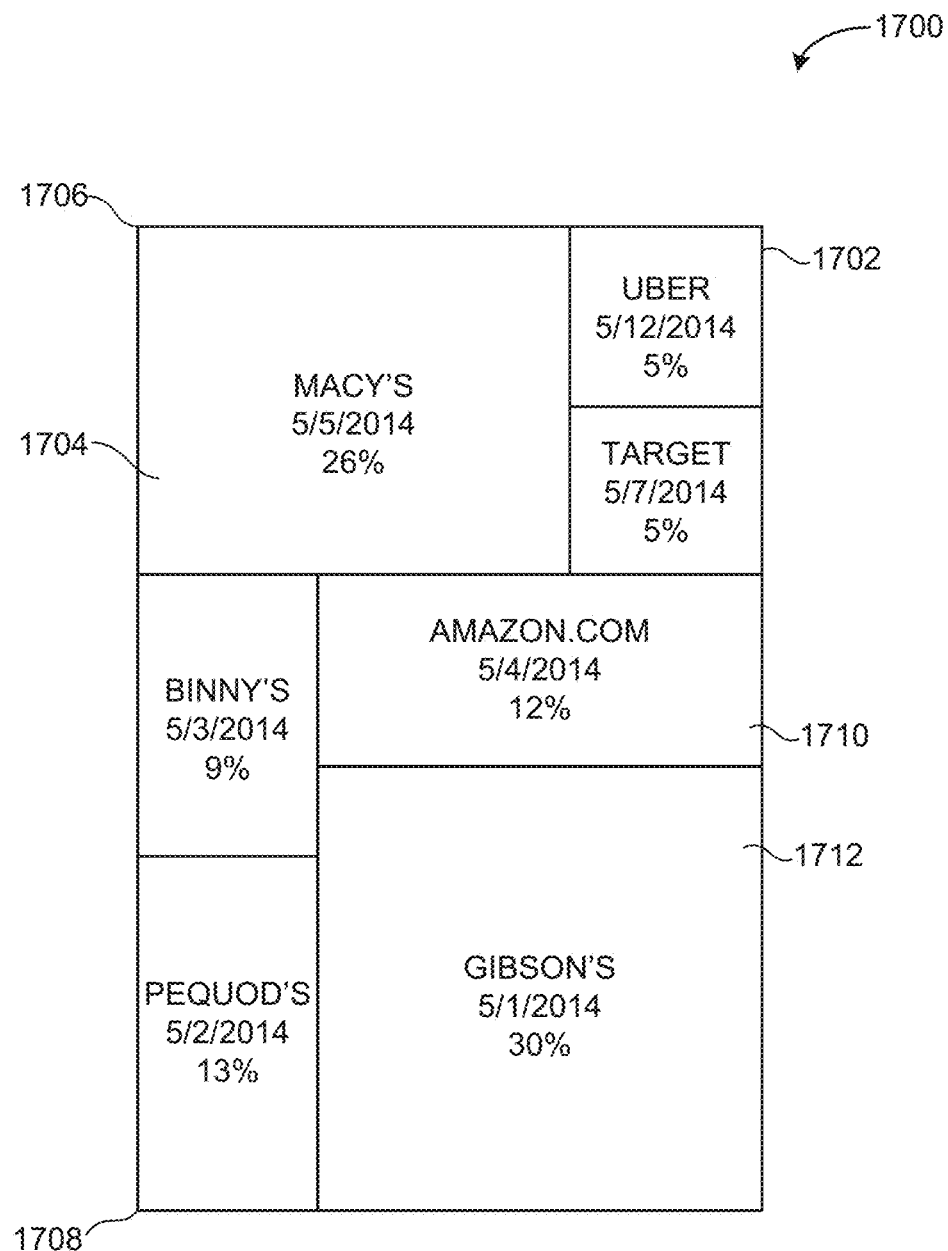
FIGS. 17A, 17B, and 18 illustrate user interfaces to display financial account data according to an exemplary embodiment.
Figure 17B:
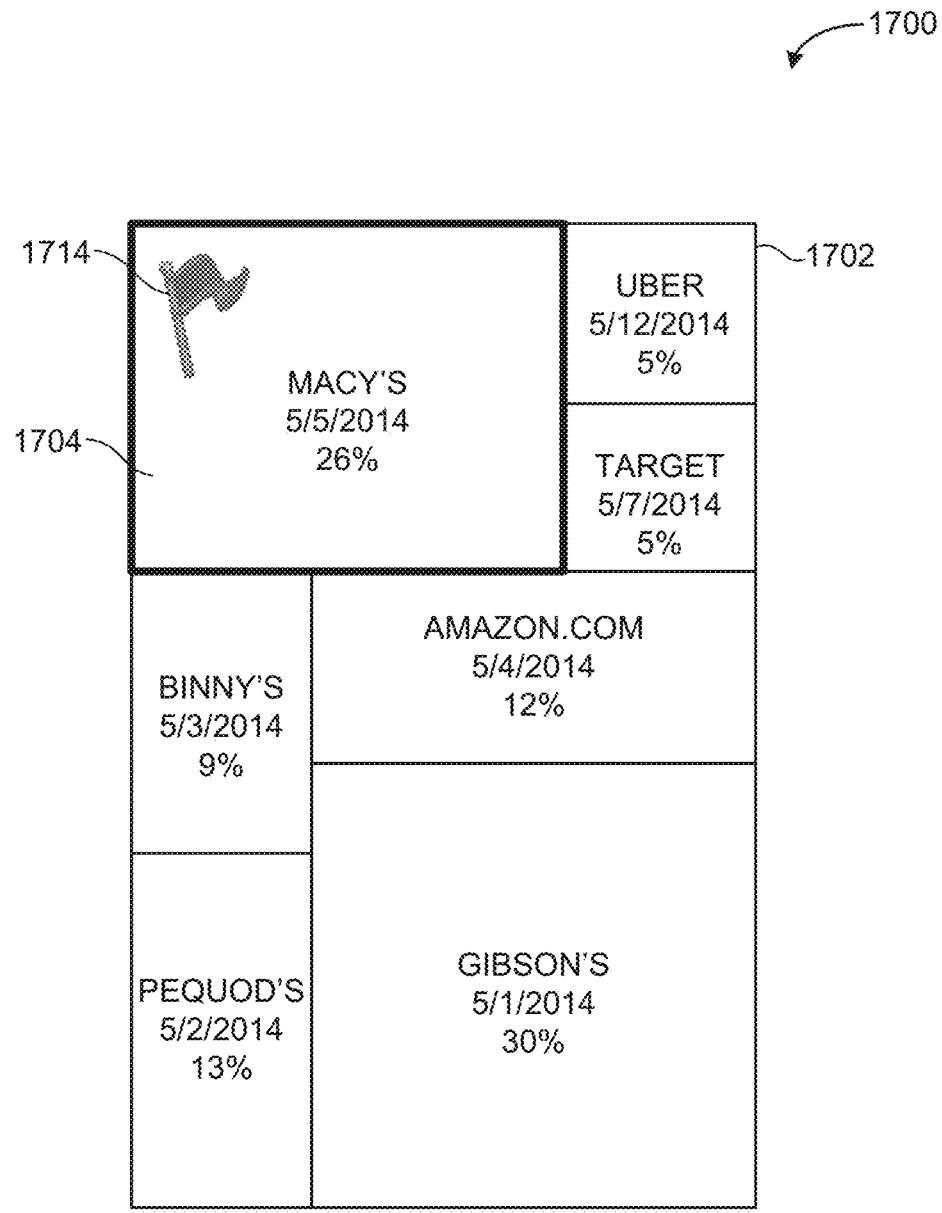

FIGS. 17A and 17B illustrate a user interface 1700 in accordance with an exemplary embodiment. The user interface 1700 may be displayed in connection with the data processing system 100 of FIG. 1 and any of the other user interfaces described herein. In one embodiment, the user interface 1700 illustrates transactions within a budget category or subcategory. For example, in one embodiment, the user interface 1700 may be an alternative to the treemap 1604 of FIG. 16. In various embodiments, the personal financial management logic 118 may leverage any of various treemapping algorithms to generate the user interface 1700. In certain embodiments, such treemaps may utilize nested rectangles, grouped circles, other shapes, colors, and/or combinations thereof. The user interface 1700 may be particularly suitable for use on touch screen devices such as tablets and mobile telephones due to the large, easy to select items, as will be explained in further detail below. However, the features and functionality of the user interface 1700 may be implemented on any device.

As shown in FIG. 17A, the user interface 1700 is illustrated as it would be displayed on a screen 1702. Mobile devices such as mobile telephones and tablet computers have limited screen size. As such, developers encounter unique challenges in designing user interfaces to be user friendly such that a user can easily read and interact with the content that is displayed. To that end, the user interface 1700 as displayed on the screen 1702 includes various transaction blocks 1704 that represent individual transactions. Each transaction block 1704 is sized proportionate to the amount of its associated transaction relative to the total budget or budget category amount. In some embodiments, the number of transactions that are displayed depends on certain factors, such as screen size and/or transaction amount. For example, fewer transactions may be displayed on a mobile telephone screen than on a tablet computer screen. The transaction blocks 1704 may be sized such that the smallest transaction block is easily selectable by a user via, for example, a touch screen display.

In some embodiments, other aspects of the transaction blocks 1704 such as position, aspect ratio, and/or color may also convey information about the transactions associated therewith. In some embodiments, each transaction block 1704 is positioned on the screen 1702 according to certain parameters. For example, in some embodiments, the most recent transactions are positioned towards a top end 1706 of the screen 1702, while older transactions are positioned towards a bottom end 1708 of the screen 1702. In other embodiments, the aspect ratio of each transaction block 1704 is determined based on certain parameters. For example, a first transaction block 1710 has a horizontal aspect ratio whereas a second transaction block 1712 has a vertical aspect ratio. In one embodiment, aspect ratios are selected based on metadata associated with each transaction. In an embodiment, the transaction categorization logic 122 is capable of automatically subcategorizing transactions based on the metadata associated with each transaction. For example, the transaction categorization logic 122 may automatically determine that the first transaction block 1710 associated with Amazon.com can be subcategorized as "shopping" and the second transaction block 1712 associated with Gibson's can be subcategorized as "restaurants." In this example, the user interface 1700 may be configured to display transaction blocks subcategorized as shopping with horizontal aspect ratios and transaction blocks subcategorized as restaurants with vertical aspect ratios. By utilizing such space-constrained visualization techniques, the user interface 1700 is configured to demonstrate visually the relationships between transactions and budgets, and to highlight previously unseen spending patterns.

In addition to the visualization techniques mentioned above, users can perform various operations on the transaction blocks 1704 displayed on the screen 1702 according to some embodiments. In one embodiment, upon selecting one of the transaction blocks 1704, a user may be provided additional information regarding that transaction. For example, other transactions associated with the merchant of the selected transaction block 1704 may be displayed. Other information, such as charts showing various trends, such as transaction amounts at a particular merchant over time may also be displayed. In some embodiments, a user can flag a transaction.

Turning to FIG. 17B, the transaction block 1704 is shown as flagged with a flag 1714. In some embodiments, a user may flag a transaction for various reasons, such as to prompt further discussion with other shared account users. For example, a user may realize that frequent transactions at a particular merchant have a significant impact on a budget. By flagging one or more of the transactions, the other users (e.g., the other family members) can be notified of the flag, which can prompt conversation between the users. Upon flagging the transaction, the other shared account users may be notified of the flag, for example, by an email, a text message, or a notification the next time that they log into their account.

Figure 18:
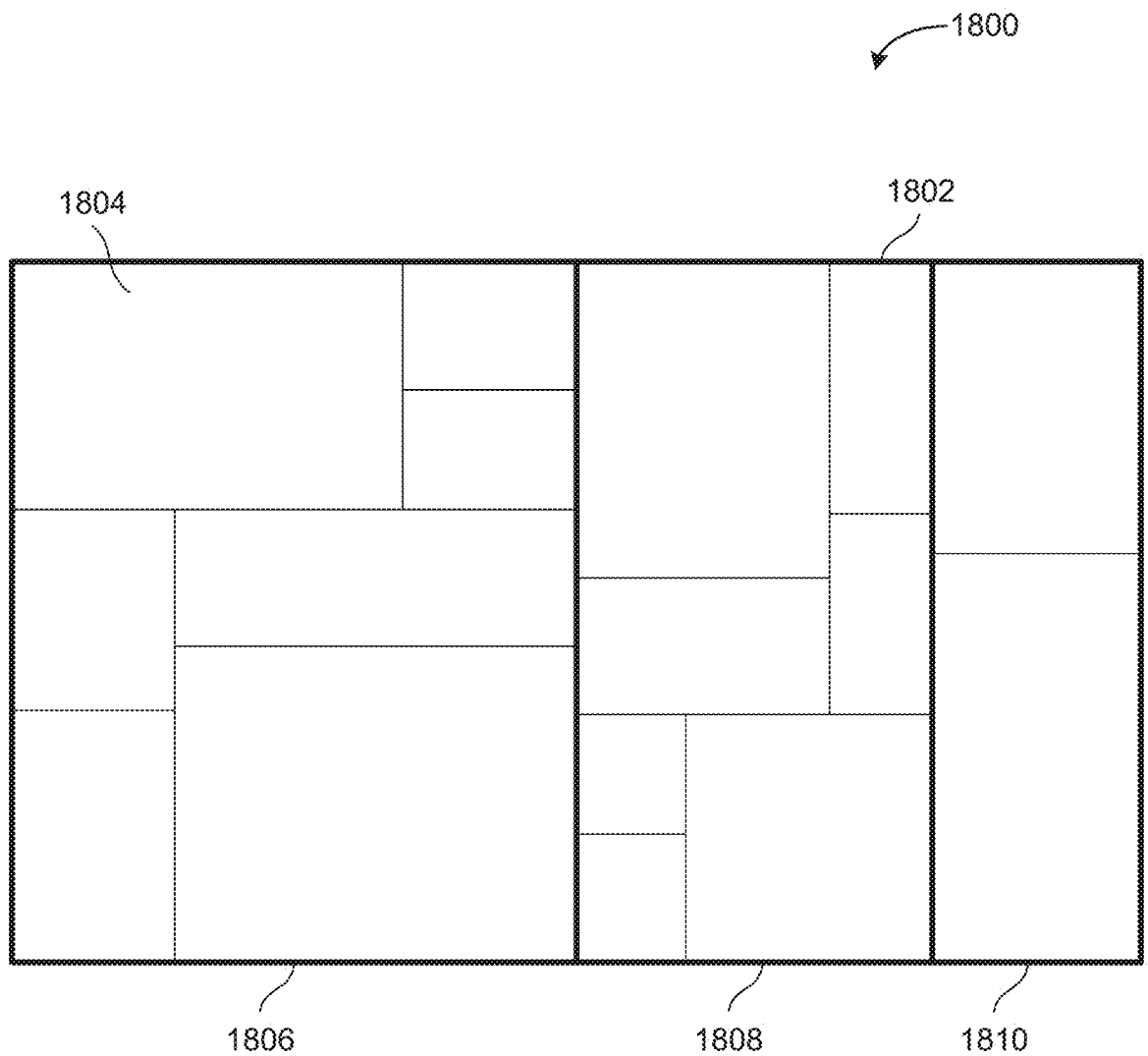

Turning to FIG. 18, a user interface 1800 is illustrated in accordance with an exemplary embodiment. The user interface 1800 may be displayed in connection with the data processing system 100 of FIG. 1 and any of the other user interfaces described herein. As shown in FIG. 18, the user interface 1800 is illustrated as it would be displayed on a screen 1802. The user interface 1800 is similar to the user interface 1700 of FIG. 17. However, the user interface 1800 has more transaction boxes 1804 and, thus, may be configured to be displayed on a larger display than the user interface 1700. The user interface 1800 includes three large rectangles 1806, 1808, and 1810, with nested rectangles (e.g., the transaction boxes 1804) within each of the three large rectangles 1806, 1808, and 1810. In one embodiment, each of the three large rectangles 1806, 1808, and 1810 represent a budget category and each of the transaction boxes 1804 within the respective rectangles represent the transactions within the respective budget categories. It should be appreciated that the foregoing are merely non-limiting examples of user interfaces in conjunction with the present disclosure.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing system in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method comprising:
   receiving, by a computer system, first log-in credentials from a first user;
   comparing, by the computer system, the first log-in credentials with first authentication information of a first user account maintained in a database communicably coupled to the computer system;
   determining, by the computer system based on the first authentication information, that the first user account has first access rights to a bank account of a financial institution;
   receiving, by the computer system, second log-in credentials of a second user;
   comparing, by the computer system, the second log-in credentials with second authentication information of a second user account maintained in the database;
   determining, by the computer system based on the second authentication information, that the second user account has second access rights to the bank account of the financial institution;
   providing, by the computer system, the first access rights to the first user account of the first user, the first access rights including full access to the bank account;
   providing, by the computer system, the second access rights to the second user account of the second user, the second access rights including restricted access to the bank account;
   establishing, by the computer system, a connection between the second user account and a server hosting a website for accessing information for the bank account;
   providing, by the computer system via the website and according to the second access rights, a user interface displaying a plurality of budget categories for categorizing at least one transaction associated with the bank account to the second user account;
   determining, by the computer system, a first subcategory of the plurality of budget categories and a second subcategory of the plurality of budget categories based on data associated with the at least one transaction;
   receiving, by the computer system from the second user account, a user input comprising a selection of at least one of the first subcategory or the second subcategory; and
   displaying, by the computer system to the user interface and responsive to receiving the user input, a summary section of the selected first subcategory or second subcategory, the summary section including at least one of a subcategory name, an amount attributed to the subcategory, or a percentage of a total budgeted amount attributed to the subcategory, wherein the user interface comprises graphical representations of the first subcategory and the second subcategory displayed as a treemap, and wherein the graphical representations of each of the first subcategory and the second subcategory have an aspect ratio that is based on the data associated with the at least one transaction.

2. The computer-implemented method of claim 1, wherein a graphical representation of the first subcategory is larger in size than a graphical representation of the second subcategory.

3. The computer-implemented method of claim 1, wherein the treemap comprises a plurality of circles sized according to a portion of the total budgeted amount attributed to each subcategory.

4. The computer-implemented method of claim 1, wherein the user interface comprises a spending history section including shapes that are sized in proportion to spending in at least one of the first subcategory or the second subcategory over a predetermined period of time.

5. The computer-implemented method of claim 1, wherein the second access rights comprises representing amounts associated with the subcategories as percentages.

6. The computer-implemented method of claim 1, wherein the second access rights comprises hiding at least one budget category of the plurality of budget categories.

7. A system comprising:
   a data storage system; and
   a processor and program logic stored in memory and executed by the processor, the program logic including:
   rights management logic configured to:
      receive first log-in credentials from a first user;
      compare the first log-in credentials with first authentication information of a first user account maintained in a database communicably coupled to a computer system;

determine, based on the first authentication information, that the first user account has first access rights to a bank account of a financial institution;

receive second log-in credentials of a second user;

compare the second log-in credentials with second authentication information of a second user account maintained in the database;

determine, based on the second authentication information, that the second user account has second access rights to the bank account of the financial institution;

provide the first access rights to the first user account of the first user, the first access rights including full access to the bank account;

provide the second access rights to the second user account of the second user, the second access rights including restricted access to the bank account; and personal financial management logic coupled to the rights management logic and configured to:

establish a connection between the second user account and a server hosting a website for accessing information for the bank account;

provide, via the website and according to the second access rights, a user interface displaying a plurality of budget categories for categorizing at least one transaction associated with the bank account to the second user account;

determine a first subcategory of the plurality of budget categories and a second subcategory of the plurality of budget categories based on data associated with the at least one transaction;

receive, from the second user account, a user input comprising a selection of at least one of the first subcategory or the second subcategory; and display, to the user interface and responsive to receiving the user input, a summary section of the selected first subcategory or second subcategory, the summary section including at least one of a subcategory name, an amount attributed to the subcategory, or a percentage of a total budgeted amount attributed to the subcategory, wherein the user interface comprises graphical representations of the first subcategory and the second subcategory displayed as a treemap, and wherein the graphical representations of each of the first subcategory and the second subcategory have an aspect ratio that is based on the data associated with the at least one transaction.

8. The system of claim 7, wherein a graphical representation of the first subcategory is larger in size than a graphical representation of the second subcategory.

9. The system of claim 7, wherein the treemap comprises a plurality of circles sized according to a portion of the total budgeted amount attributed to each subcategory.

10. The system of claim 7, wherein the user interface comprises a spending history section including shapes that are sized in proportion to spending in at least one of the first subcategory or the second subcategory over a predetermined period of time.

11. The system of claim 7, wherein the second access rights comprises representing amounts associated with the subcategories as percentages.

12. The system of claim 7, further comprising account management logic coupled to the rights management logic and to the personal financial management logic, the account management logic configured to:

maintain, in a database communicably coupled to the account management logic, the first authentication information of the first user account and the second authentication information of the second user account.

* * * * *